US005596350A

United States Patent [19]
Capps et al.

[11] Patent Number: 5,596,350
[45] Date of Patent: Jan. 21, 1997

[54] SYSTEM AND METHOD OF REFLOWING INK OBJECTS

[75] Inventors: Stephen P. Capps, San Carlos; Giulia Pagallo, Cupertino, both of Calif.

[73] Assignee: Apple Computer, Inc., Cupertino, Calif.

[21] Appl. No.: 397,549

[22] Filed: Mar. 1, 1995

Related U.S. Application Data

[63] Continuation of Ser. No. 101,505, Aug. 2, 1993, abandoned.

[51] Int. Cl.⁶ .................................................. G09G 5/00
[52] U.S. Cl. ........................... 345/173; 345/179; 382/188
[58] Field of Search ...................................... 345/172, 179, 345/180, 181, 182, 183, 141, 117, 901; 382/187, 188, 189, 181, 309; 178/18, 19

[56] References Cited

U.S. PATENT DOCUMENTS

| | | | |
|---|---|---|---|
| 4,190,833 | 2/1980 | Bejting et al. | 345/180 |
| 4,531,231 | 7/1985 | Crane et al. | 382/13 |
| 4,545,023 | 10/1985 | Mizzi | 345/173 |
| 4,573,196 | 2/1986 | Crane et al. | 382/13 |
| 4,727,588 | 2/1988 | Fox et al. | 345/141 |
| 4,839,634 | 6/1989 | More et al. | 178/18 |
| 4,972,496 | 11/1990 | Sklarew | 345/901 |
| 5,029,223 | 7/1991 | Fujisaki | 382/13 |
| 5,031,119 | 7/1991 | Dulaney et al. | 345/173 |
| 5,138,668 | 8/1992 | Abe | 382/13 |
| 5,150,424 | 9/1992 | Aguro et al. | 382/13 |

OTHER PUBLICATIONS

O'Connor, Rory J., "Apple Banking on Newton's Brain", Apr. 22, 1992, San Jose Mercury News.
Weiman, Liza and Moran, Tom, "A Step Toward the Future", Aug. 1992, Macworld Magazine. pp. 129–131.
Soviero, Marcelle M., "Your World According to Newton", Sep. 1992, Popular Science Magazine, pp. 46–49.
Abatemarco, Fred, "From the Editor", Sep. 1992, Popular Science Magazine. P. 4.
Apple Computer Inc., "Macintosh User's Guide", 1991. Pp. 47–50.
O'Connor, Rory J., "Aha's software helps pen PC's", Jun. 15, 1993, San Jose Mercury News.
Mossberg, Walter S., "Eo, your new PDA, does many tasks PDQ but isn't revolutionary", 1993 (specific date unknown), The Wall Street Journal.

*Primary Examiner*—Richard Hjerpe
*Assistant Examiner*—Regina Liang
*Attorney, Agent, or Firm*—Hickman Beyer & Weaver

[57] ABSTRACT

A pen-based system for reflowing handwritten ink objects is disclosed. The system divides the ink objects into paragraphs by identifying groups of ink objects separated from other groups by predefined distances. Each such paragraph is classified as either a graphics paragraph or a text paragraph; graphics paragraphs are formatted according to a graphics formatting protocol and text paragraphs are formatted according to a text formatting protocol. In addition, the system writes formatted paragraphs to destinations where they are displayed. The destination may be a screen on which the ink objects were originally written by a user and/or a printed page, a computer monitor, etc.

35 Claims, 25 Drawing Sheets

Figure 12a
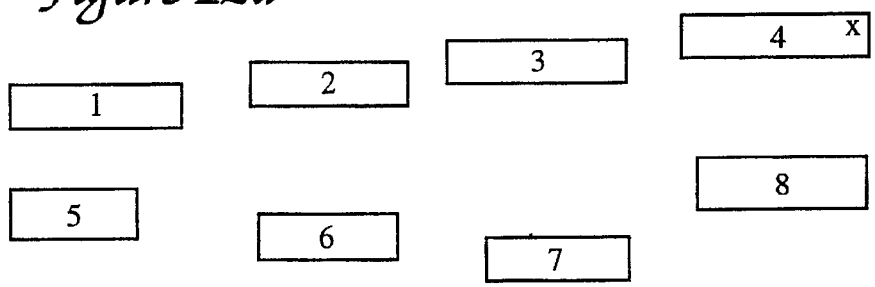
Figure 12b
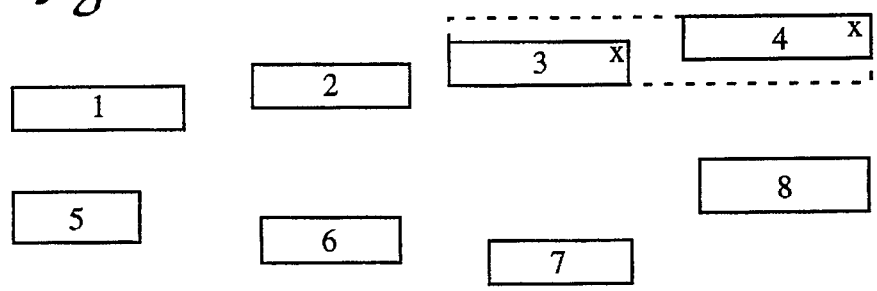
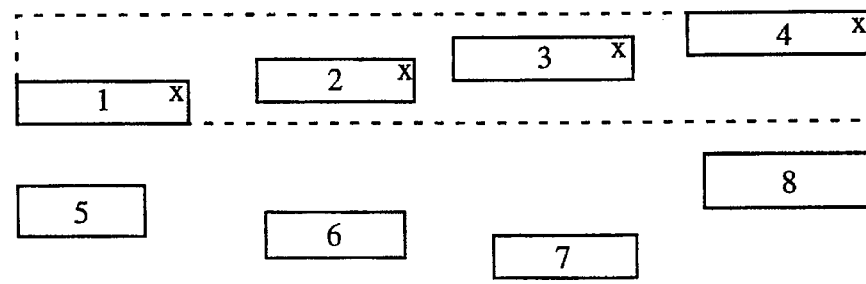
Figure 12c

This is an example of ink reflow.
one two three four five six
seven eight nine ten eleven
twelve thirteen

SYSTEM AND METHOD OF REFLOWING INK OBJECTS

This is a continuation of application Ser. No. 08/101,505 filed Aug. 2, 1993 is now abandoned.

BACKGROUND OF THE INVENTION

This invention relates generally to computer systems, and to graphical user interfaces for computer systems. More specifically, the invention pertains to systems for organizing handwritten images in a document.

Computerized personal organizers are becoming increasingly popular. They perform such functions as keeping a calendar, an address book, a to-do list, etc. While these functions can be provided by conventional computer systems, they are more conveniently provided by personal organizers which are relatively inexpensive, small, and lightweight (i.e. portable). Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function displays of pen-based computer systems permit users to operate the computers as computerized notepads. For example, graphical images can be input into the pen-based computer by merely moving the stylus across the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, the "ink" can be identified as text and numeric information.

One of the most desirable functions of a pen-based computer system is the ability to take and retrieve notes. In the past, however, the entry of text and graphics into a pen-based computer system has been severely limited by constraints imposed by the pen-based computer's operating system. For example, text typically had to be entered in small boxes or fields, and usually the location for insertion of text was specifically identified. Further, the ability to reformat material entered into prior pen-based computer systems was quite limited. Often a user will wish to have rough handwritten notes organized in easy-to-read straight lines and paragraphs. Thus, there remains a need for a system that can accept ink notes jotted anywhere on a screen and then organize them in a consistent and convenient format.

SUMMARY OF THE INVENTION

The present invention provides a system and method for reflowing handwritten information. As used herein, the term "reflowing" refers to any protocol in which handwriting is rearranged or reformatted without necessarily being recognized as higher level objects such as characters or shapes. Thus, the user jots down some rough notes and the invention rearranges them according to a method described herein. The reflowing method typically employs multiple steps. In a preferred embodiment, the ink written by the user is initially saved as ink objects which are grouped into paragraphs of one of two types: text paragraphs and graphics paragraphs. Subsequently, the text paragraphs are formatted according to a text formatting protocol and the graphics paragraphs are formatted according to a graphics formatting protocol.

Various methods can be employed to distinguish between text and graphics paragraphs. In one embodiment of this invention, graphics paragraphs are identified by the size of the information they contain. In a preferred method, graphics paragraphs are identified as those paragraphs containing at least one ink object larger than a specified height (e.g., about 15 mm on some screens). Preferably, the graphics paragraphs are formatted by centering the contents of the paragraph within a destination such as a pen-based computer display on which the paragraph was written or a sheet of paper from a printout. Preferably, the text paragraphs are formatted by dividing the words of the paragraph into lines, each separated from one another by defined line separation distances. Further, the words within the lines preferably are separated from one another by defined word separation distances. In a particularly preferred embodiment, the individual lines (and words) are spaced from one another by equal distances. Further, the words in the lines are written on straight, parallel baselines.

Typical handwriting is not particularly easy to read or efficiently organized, especially when written rapidly as is often the case in business settings. For example, typical handwriting contains various words, lines, and shapes which are arbitrarily spaced from one another and sometimes even written at angles with respect to one another. As can be appreciated from the above discussion, the present invention can improve the arrangement of such handwriting, organizing it in an easy to read and space efficient manner.

If the handwriting is written on a dual-function screen where it is subsequently reflowed and displayed, the user will observe that his or her handwritten text is rearranged on the screen soon after it is written. Alternatively or in addition, the handwriting may be reflowed and written to a different destination such as a computer screen or a sheet of paper. Each destination will preferably have margins defining the regions within which the reflowed information is written. In addition, the reflowed information may be justified, indented, or otherwise formatted as desired. In some embodiments, the information is reflowed and written to the destination(s) automatically, without instruction from the user. In other embodiments, the information is reflowed only after the user instructs the system to reflow and/or display the handwriting.

A further understanding of the present invention will be had upon reading the following description of preferred embodiments and the associated figures.

BRIEF DESCRIPTION OF THE DRAWINGS

FIGS. 12a to 12e are diagrams showing the progression of process steps employed to partition ink objects into lines;

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
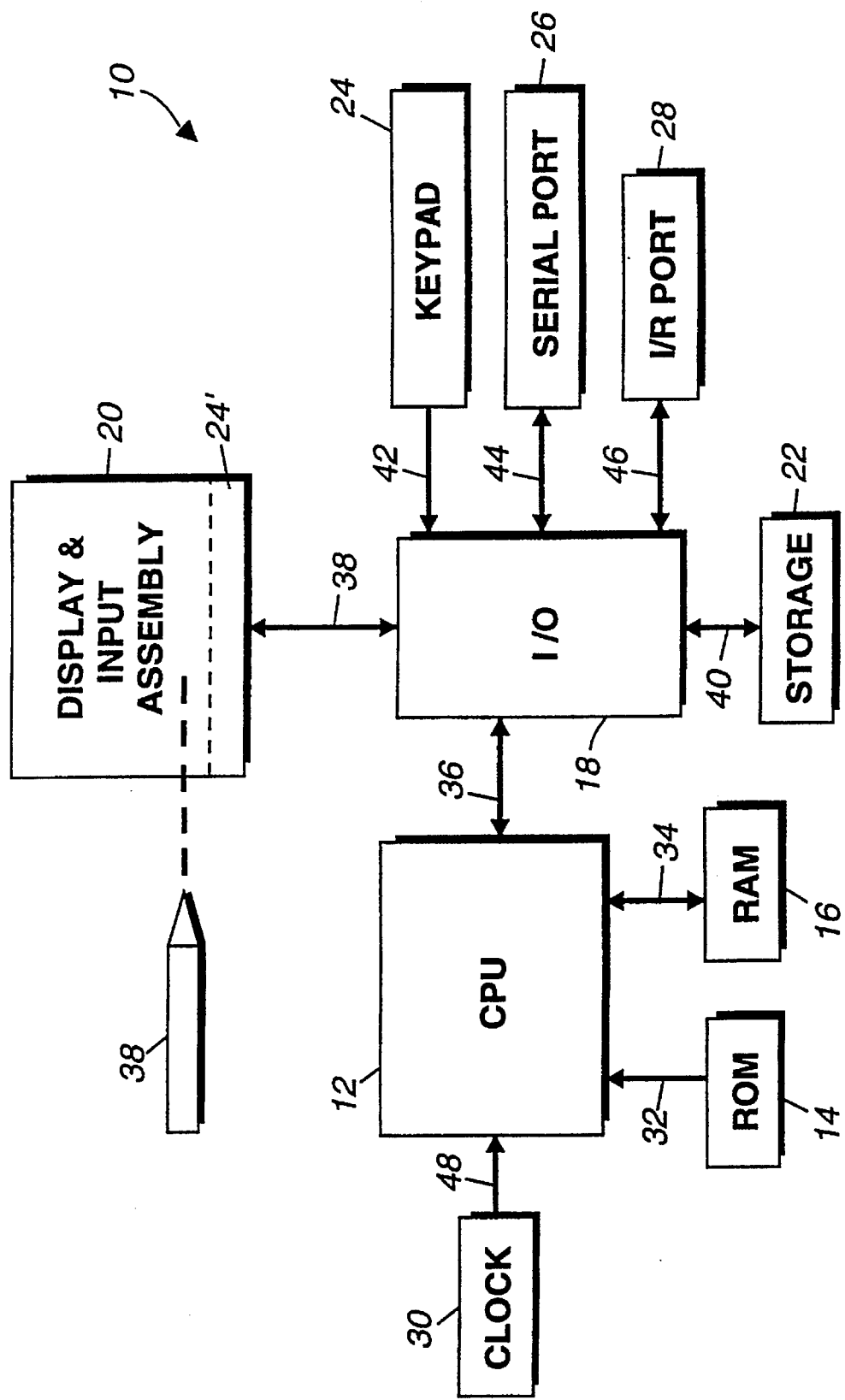
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 38. When operating as an output device, the display assembly 20 receives data from FO circuitry 18 via bus 38 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
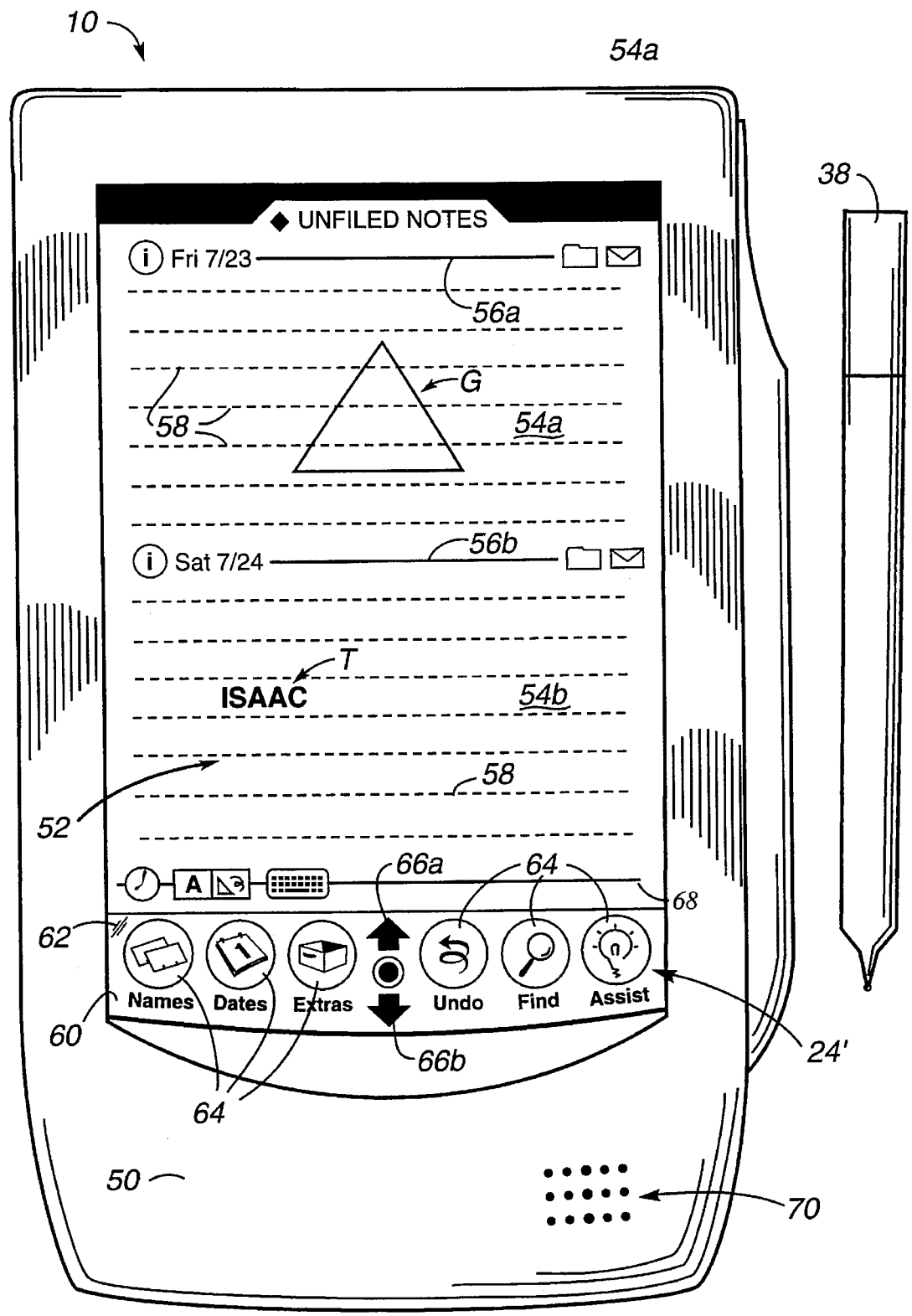
FIG. 2 is a top plan view of the screen, case, and keypad of the computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 38 and I/O 18. An example of pseudo keypad 24' is shown in FIG. 2.

While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 38 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 38 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header bar 56a and a number of guidelines 58. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in co-pending U.S. patent application Ser. No. 07/868,013, filed Apr. 13, 1992 on behalf of Tchao et al., assigned to the assignee of the present invention and incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, runs within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation,* by Brachman and Leveseque, Morgan Kaufman, San Mateo, 1985.

It will be noted there is a liberal use of graphic elements in the present invention. For example, the header bars 56a and 56b include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III.*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

Figure 3:
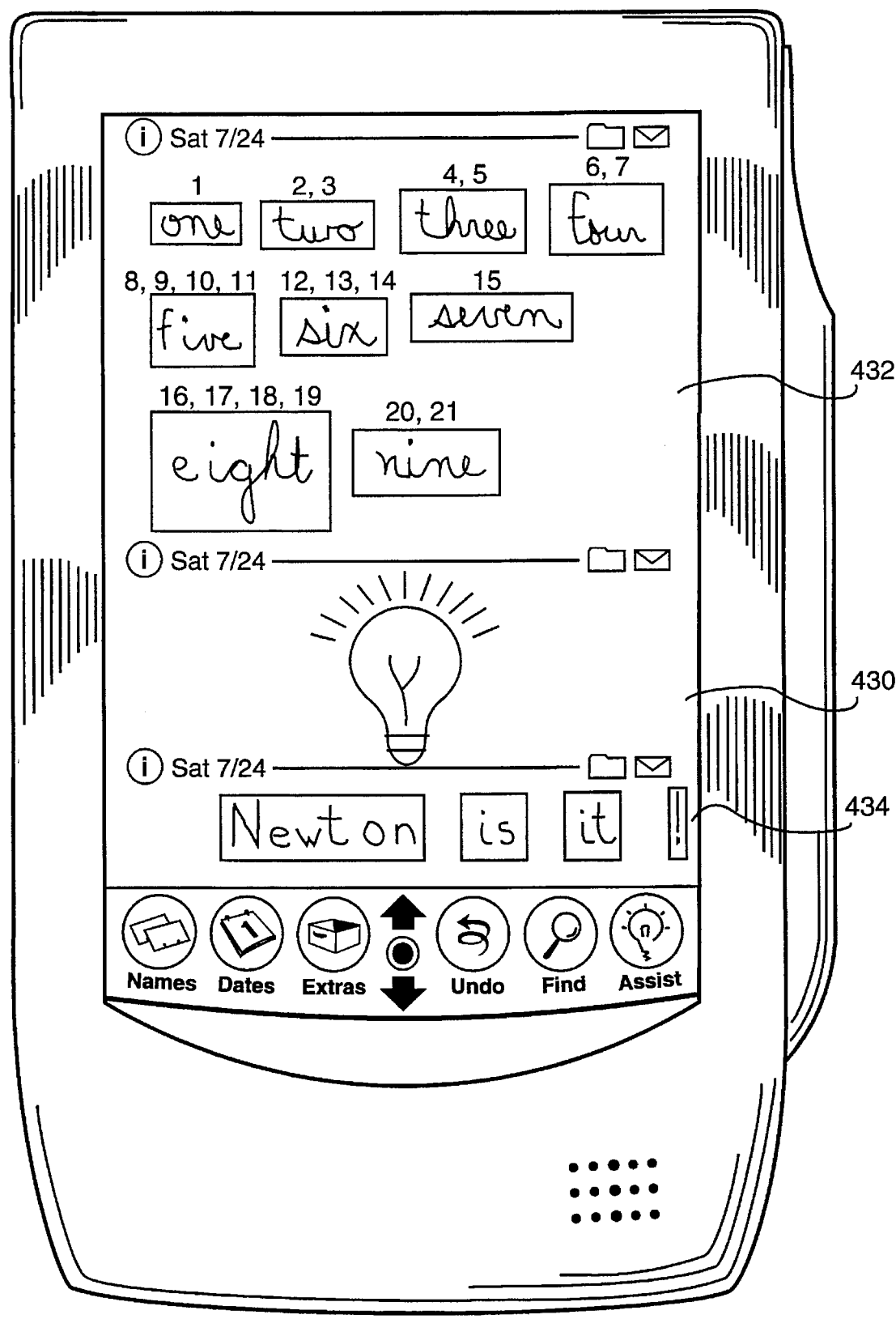
FIG. 3 is a screen view of an exemplary collection of ink objects reformatted according to the present invention.

FIG. 3 depicts exemplary graphical and textual ink objects that have been "reflowed" according to the method of the present invention. As explained above, users of pen-based systems often write information inefficiently. For example, they sometimes write at angles, outside of margins, or with differing amounts of spacing between individual words, lines, and paragraphs. Such inefficiently written text may be reflowed according to the present invention to appear as shown in FIG. 3, for example. The logic of the present invention will divide the written information into paragraphs such as those shown as 432, 430, and 434 in FIG. 3. Each paragraphs is identified as either a graphics paragraph (e.g., 430) or a text paragraph (e.g., 432 and 434). Paragraphs identified as graphics paragraphs are preferably formatted by centering within the destination. Text paragraphs are divided into words and lines such as is shown in 432, where three lines are displayed. The words of a paragraph are preferably spaced from one another by equal distances. Likewise, the lines of a paragraph are preferably spaced from one another by equal distances.

The basic unit of information used by this invention is defined as an "ink object." As used in this document, term ink object (or just "object") refers to a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In one preferred embodiment, an ink object is any ink stroke defined by the movement of the stylus (or other pointer) on a screen during the period between when the stylus is first placed on the screen and when it is removed from the screen. Alternatively, ink objects can be defined as blocks of ink located in a limited spatial region on a screen. Ink objects can be combined to form other objects or entities. For example, individual words in reflowed paragraphs of this invention can be defined as combinations of one or more such ink objects which are separated from other ink objects by at least a predefined distance. Ink objects which are closer than this predefined distance are combined to form words. Thus, for example, the word "two" shown in FIG. 3 is a combination of two ink objects: the vertical line of the letter "t" together with the "w" and "o", and the horizontal cross of the "t". For comparison, the word "five" is shown as a combination of four ink objects: the main part of the letter "f", the cross of the "f" together with the main part of the letter "i", the letters "v" and "e" written together, and the dot of the letter "i". For further comparison, the word "one" is written as a single ink object. As should be apparent, the individual ink objects in this example are completed pen strokes.

Each word shown in FIG. 3 is conceptually surrounded by a rectangular "bounding box" which comprises a minimum rectilinear box which surrounds a word object. Normally, these bounding boxes are invisible to the user, but are shown here for clarity. Such bounding boxes are useful for further organizing the objects contained therein. For example, the bounding boxes for a group of words can be organized into lines such that the words are displayed along a common baseline. As can be seen, the words "one", "two", and "three" are displayed along a straight line. The various words of a line are separated from one another by a predefined constant work separation distance, while the individual lines are separated from one another by a predefined constant line separation distance.

Figure 4:
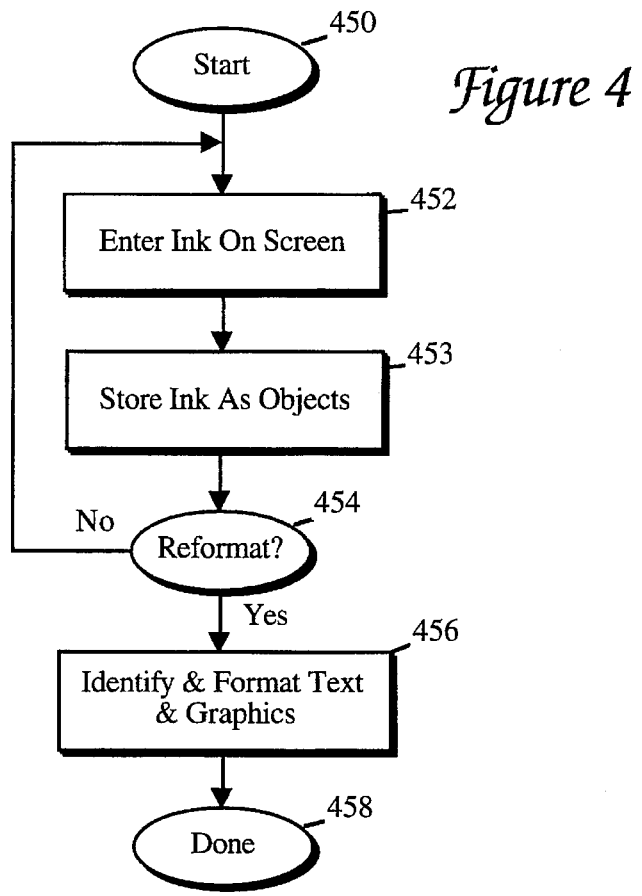
FIG. 4 is a flow diagram showing the context in which ink objects are reflowed according to this invention.

FIG. 4 shows an overview of the methodology employed to initiate the process of this invention. After the process is started at 450, the user enters ink on a screen with a stylus as described above and shown at process step 452. The ink written by the user then is stored as ink objects by a suitable method at step 453. At this point, a decision must be made as to whether the inked objects are to be reformatted according to the present invention. This option is shown at decision step 454 in FIG. 4. If the decision is made to not reformat the ink objects, the system returns to step 452. If, on the other hand, a decision is made to go ahead and reformat, the system moves to step 456 where the ink objects are identified and formatted as either text or graphics. When this task is complete, the process is completed as indicated at end state 458.

The decision regarding reformatting can be made by various procedures. In a preferred embodiment, ink objects are automatically reformatted. In some cases, the user will be given the ability to disable this function by depressing a button or flipping a switch, for example. In an alternative embodiment, the system itself decides whether to reformat the ink objects. The basis of the system's decision might be a rough estimate of the degree of disorganization in the originally written ink objects, for example.

The reformatting operation performed at step 456 also can be implemented at different times. In one embodiment, it is conducted "on the fly" as the user is writing ink on the screen. In this case, the inked objects are reflowed (e.g. aligned, separated by fixed distances, etc.) after the user has completed writing a line, paragraph, etc. In another embodiment, the reformatting operation would take place after a predetermined time-out period during which the user enters no new information. In an alternative embodiment, the reformatting operations are conducted only after the user instructs the system to reformat. In this embodiment, the system takes no action to reformat the ink unless the user activates the system (by pushing a button as mentioned above for example).

Figure 5:
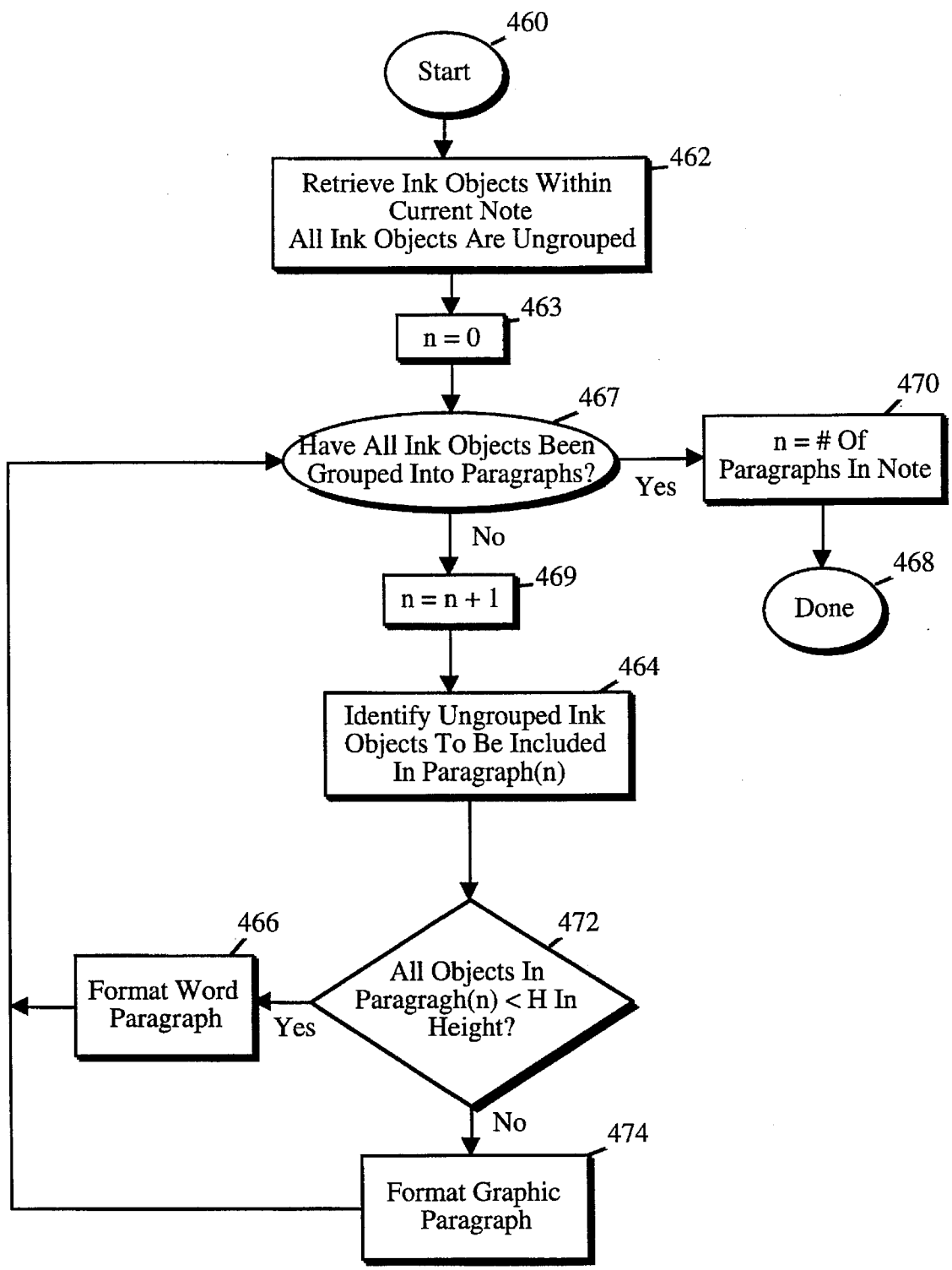
FIG. 5 is a flow diagram illustrating how ink objects are initially partitioned into paragraphs and formatted as graphics or text paragraphs.

An overview of the procedures implemented in step 456 of FIG. 4 (identifying and formatting text and graphics) is provided in FIG. 5. In this process, the ink objects are partitioned into a number of rough paragraphs ("n"). As explained in more detail below, the system preferably identifies paragraphs as groups of words which are separated from other groups of words by a predetermined distance. Likewise, the system generally displays reflowed paragraphs on the screen as groups of words separated by horizontal spaces of defined distance. After a decision is made to reformat, this task is started at step 460. First, the ink objects within the document are retrieved at step 462. More particularly, the ink objects within a "current note" are retrieved. As discussed above in connection with FIG. 2, a "note" is a unit of information defined by the user and delineated by header bars. The retrieved ink objects are typically those objects which have not yet been recognized as characters, shapes, etc. by a "recognizer". In some cases, the user may desire that the ink objects are never recognized by a recognizer. Exemplary recognizers are described in U.S. patent application Ser. No. 08/001,123 filed on Jan. 5, 1993, naming Pagallo et al. as inventors, and entitled "Method and Apparatus for Computerized Recognition." Other applications discussing recognizers include U.S. patent application Ser. No. 07/889,216, filed on May 27, 1992, naming Beerninck et al. as inventors, and entitled "Recognition Architecture and Interface"; U.S. patent application Ser. No. 08/001,122, filed on Jan. 5, 1993 naming Bozinovic et al. as inventors, and entitled "Shape Recognizer for Graphical Computer Systems"; U.S. patent application Ser. No. 08/068,443, filed on May 27, 1993, naming Beerninck et al. as inventors, and entitled "Method and Apparatus for Recognizing Handwritten Words"; and U.S. patent application Ser. No. 08/000,932, filed on Jan. 5, 1993 naming Pagallo as inventor, and entitled "Method and Apparatus for Graphically Inputting Equations." Each of the above applications is assigned to the assignee of the present invention and is incorporated herein by reference for all purposes.

At the outset a paragraph counter n is initialized to zero at a step 463. To form the first paragraph, the system first ensures that all the objects in the note have not already been grouped in a paragraph in a step 467, and then the system increments the paragraph count in a step 469. Next, the system evaluates the retrieved ink objects (none of which are now contained in a defined paragraph) and identifies a first group (i.e., a paragraph) of objects at step 464. At this point, the system determines whether the first paragraph is a graphics paragraph or a text paragraph. Various methods can be employed to make this determination. In a preferred embodiment, the paragraph is analyzed in a step 472 to determine whether it contains a percentage or a certain number of objects of height greater than a predetermined value, H. In a preferred embodiment, paragraphs containing only a single object of height greater than H are deemed graphics paragraphs and formatted as such at 474. If all objects in paragraph (n) are less than H in height, the paragraph is formatted as a word or text paragraph at 466. Preferably H is about 10 mm, and more preferably about 25 mm. In some embodiments, the user may adjust it to suit his or her style of writing. After the system formats the word or graphic paragraph, it loops back to step 467 to determine whether all of the retrieved ink objects have been grouped into paragraphs (step 467). If so, the current value of "n" equals the number of paragraph in the note (step 470) and the process is completed at step 468. However, as long as some ungrouped ink objects remain, the system will be forming new paragraphs. At step 469, the paragraph counter is incremented by one and the system moves to identify another group of objects that will form a new paragraph.

Although this embodiment considers a system distinguishing between text and graphics paragraphs, other types of paragraphs could also be processed. For example, in some embodiments, paragraphs comprising tables or formulas are distinguished from one another and from text paragraphs.

Figure 6:
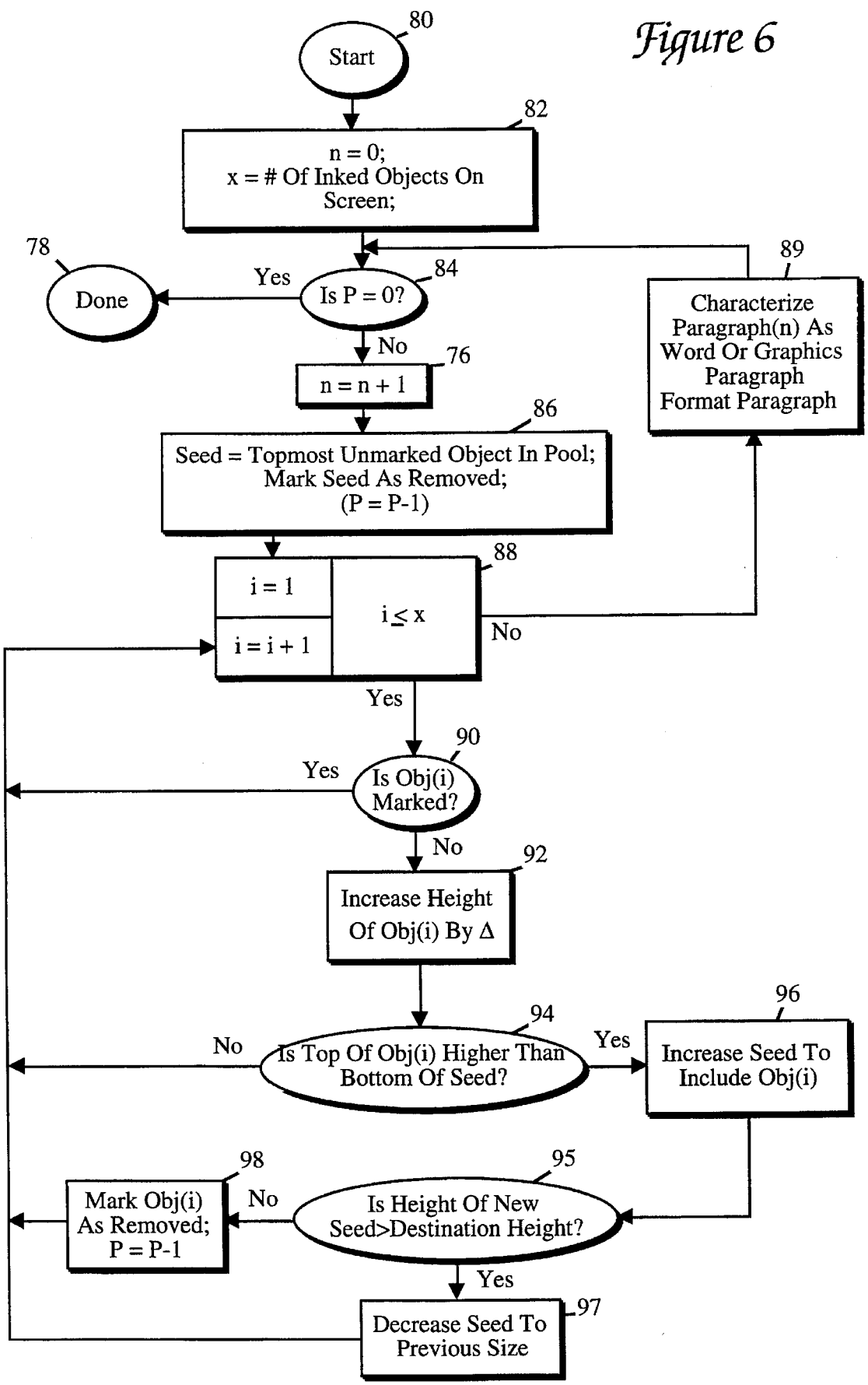
FIG. 6 is a flow diagram illustrating the details of how ink objects are partitioned into paragraphs.
Figure 7A:
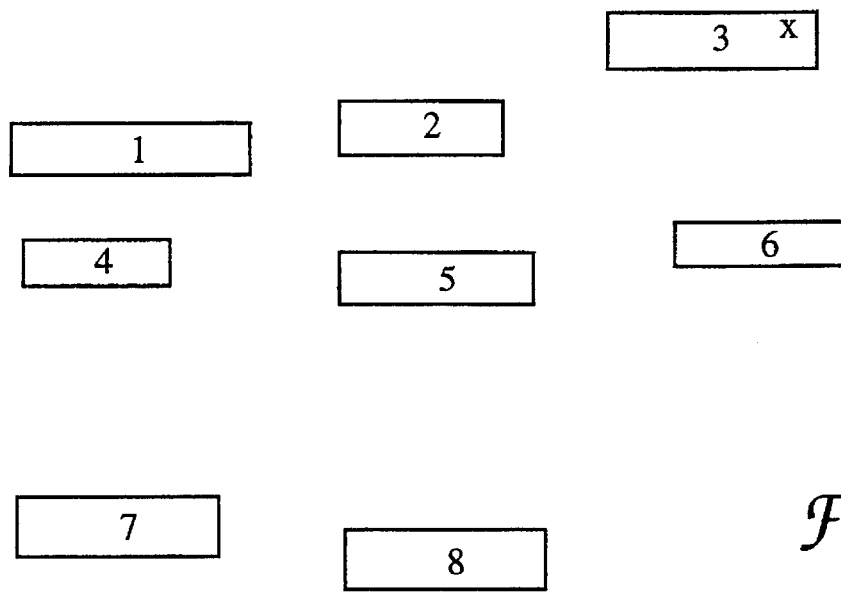
FIGS. 7a–7f are diagrams showing the steps employed in this invention to partition a sample of eight words into two paragraphs.
Figure 7B:
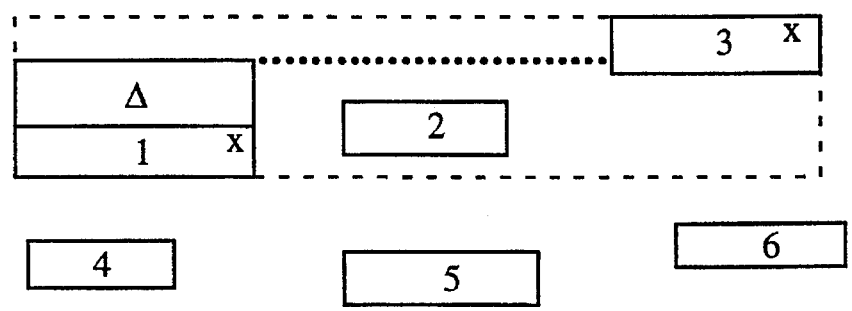
Figure 7C:
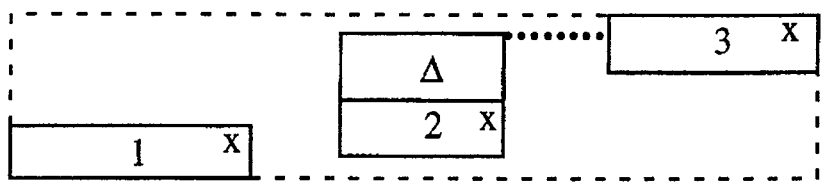
Figure 7C:
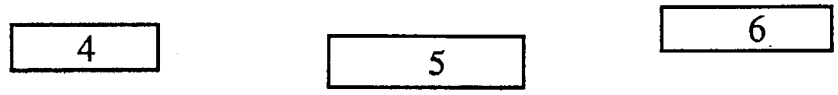
Figure 7C:
Figure 7D:
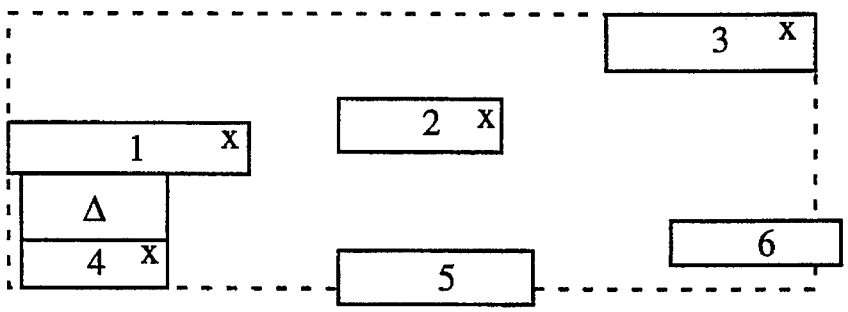
Figure 7D:
Figure 7E:
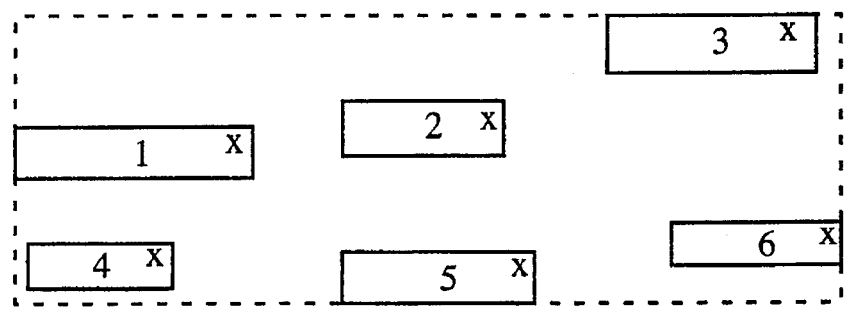
Figure 7E:
Figure 7F:
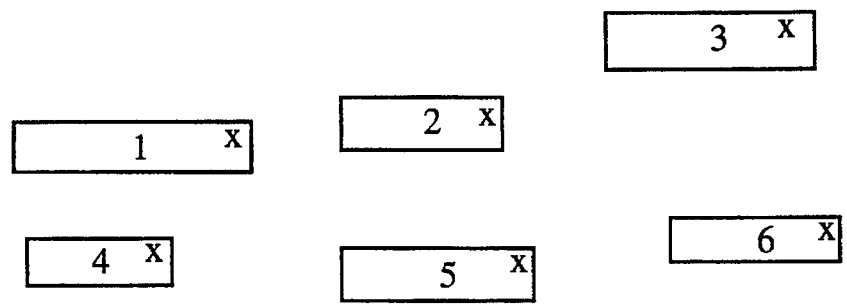
Figure 7F:

The method of partitioning ink objects into paragraphs (step 464 of FIG. 5) is detailed in FIG. 6. The process is started at step 80. Thereafter, at step 82, the number of paragraphs (n) is set to zero, "x" is defined as the number of ink objects on the screen, and "P" (the "pool" of objects) is defined as the number of unmarked objects at the beginning of the process (usually "P" equals "x" at the beginning of the process). In the steps that follow, objects are added to a paragraph, they are marked as removed, and are no longer available for incorporation in another paragraph.

The logic enters a loop in which it first determines whether the number of unmarked objects (P) is equal to zero at decision step 84. When the logic finds that unmarked objects remain, it next increments the paragraph count at step 76. The logic then identifies the unmarked ink object located at the highest point in the writing medium and designates that ink object's bounding box as a seed at process step 86. It should be noted that each individual ink object will have a defined bounding box having a top and a bottom. An iterative loop step 88 initializes a counter i to 1 and compares it to the variable x. So long as is not greater than x, the logic advances to decision step 90. There the system determines whether the object under consideration has been previously marked. If it has, the system ignores it and returns to iterative loop step 88. If the object under consideration has not been marked, the height of its bounding box is increased by a defined amount, A, at step 92. In preferred embodiments, the value of A is between about 0 and 10 mm, and more preferably between about 0 and 8 mm. Next, at decision step 94, the top of the enlarged bounding box of the object under consideration is compared with the bottom of the seed. If top of the bounding box is higher than the bottom of the seed, the seed size is increased to include the current object's bounding box at step 96. As a final check, the logic determines whether the combined height of the new seed is greater than the destination height at decision step 95. If so, the seed is reduced to its previous height at process step 97 and the logic loops back to consider the next object at iterative loop step 88. If, on the other hand, the new seed height is not greater than the destination height, the ink object is marked as removed at step 98 (i.e., it is incorporated into the current paragraph). P is then decreased by 1 and process control returns to iterative loop step 88. When each ink object in the document has been evaluated (and i is now greater than x), the logic moves to step 89 where it characterizes and formats the new paragraph. Then process control returns to steps 84, 76, and 86 (where iterative loop step 88 then directs the logic to consider each ink object again and thereby identify a new paragraph). This process is repeated until all ink objects are marked (i.e.,, incorporated into a paragraph). At this point, there are no more unmarked objects as determined at step 84, and the process is completed at step 78. In this manner, the ink objects in a note are grouped into paragraphs based upon their separation from other ink objects. In the embodiment described, a group of ink objects separated by a predefined vertical distance (typically whatever the value of delta equals) is deemed a paragraph.

FIG. 7 shows how a collection of ink objects might be grouped into two paragraphs by the process 464 of FIG. 5. Bounding boxes 7 and 8 are generally separated from bounding boxes 1–6 by a horizontal gap. Thus, one would expect that bounding boxes 1–8 should be divided into two paragraphs. At FIG. 7a, the topmost ink object, object 3, is identified as the seed and marked (as shown by the "x" inside the bounding box). At FIG. 7b, the system begins evaluating each successive ink object to determine which objects will be added to the first seed (i.e., the first paragraph). As shown, the top of the bounding box for ink object 1 is increased by the distance Δ. The dotted line shows that the top of ink object 1 now lies above the bottom of the seed. Thus, object 1 is marked and incorporated in a new seed delineated by the dashed line. In FIG. 7c, the bounding box of object 2 is extended by Δ as with object 1. As shown, object 2 clearly lies within the seed, so it is marked and included within the first paragraph. FIGS. 7d and 7e show how the seed grows to include ink objects 4, 5, and 6. Objects 7 and 8, however, fall outside of the seed, even when their bounding boxes are extended by Δ. Thus, objects 7 and 8 are not included within the first paragraph. As shown in FIG. 7f, objects 7 and 8 do form their own second paragraph by the same process as described above.

Figure 8:
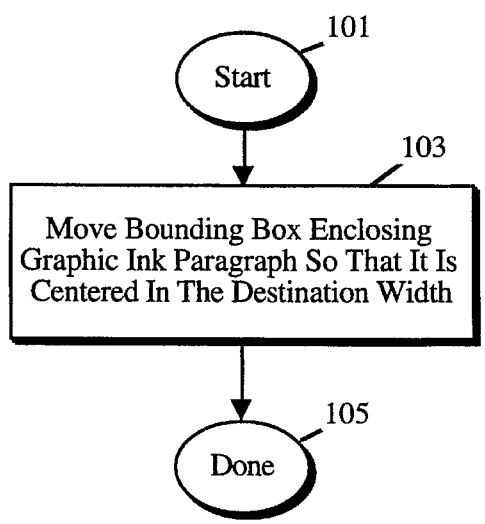
FIG. 8 is a flow diagram illustrating how graphics paragraphs are formatted.

FIG. 8 shows a preferred method of formatting graphics paragraphs. The process starts at step 101 and continues with a step 103 where a bounding box enclosing the graphic ink paragraph is centered in the destination width (the region between the margins in the destination). After this step, the reformatting is completed as indicated at 105. Other methods of reformatting graphics paragraphs may also be employed. For example, the graphics paragraph may be justified left or right in the destination. Alternatively, or in addition, the graphics paragraph may be moved to within the body of a text paragraph.

Figure 9:
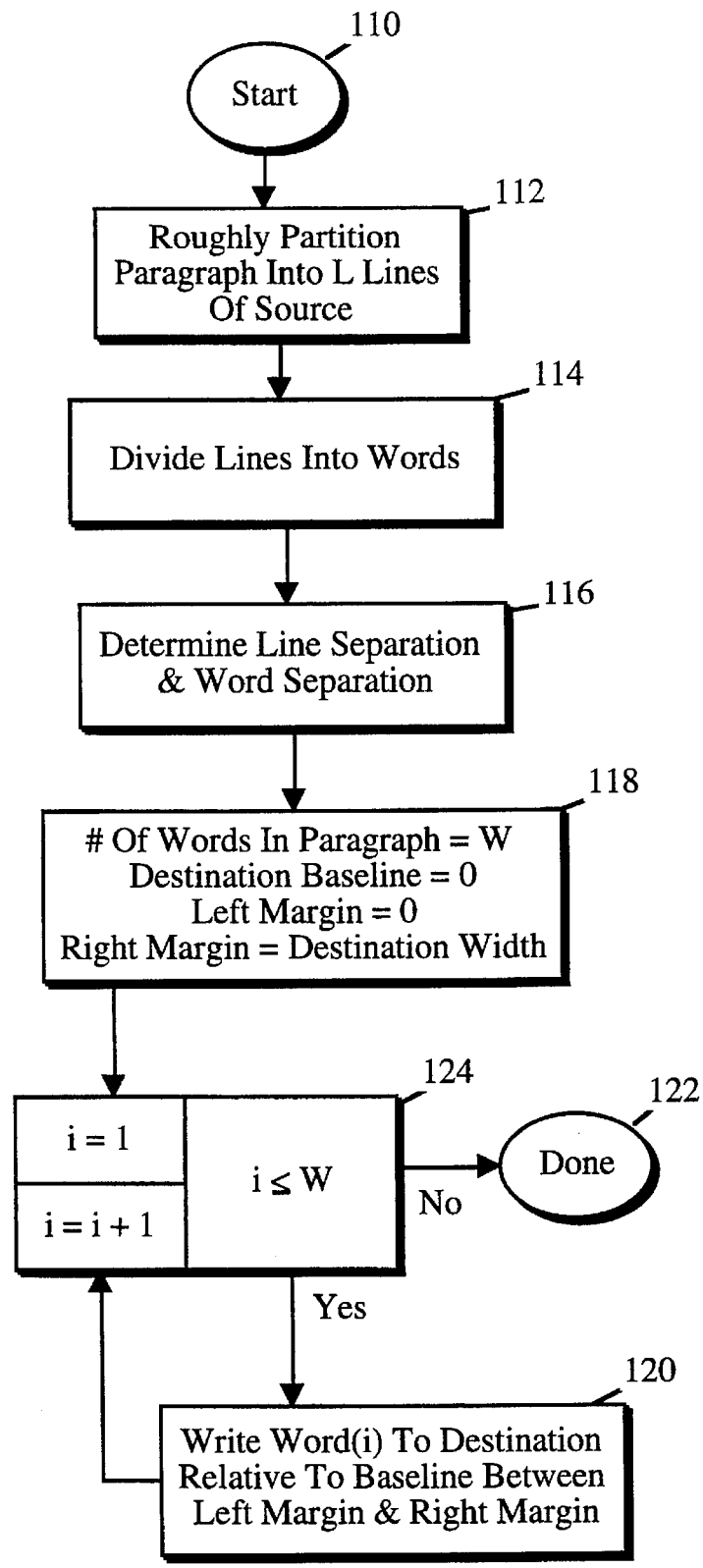
FIG. 9 is a flow diagram illustrating generally how the words of a paragraph are formatted and written to a destination.

A preferred protocol for formatting the ink objects of a text paragraph (step 466 of FIG. 5) is shown in FIG. 9. The process starts at a step 110 and then, at process step 112, roughly partitions the ink objects of the text paragraph into one or more lines separated from one another (in one direction) by at least a predefined distance. The lines are then divided into words at step 114. By dividing the text paragraph into lines and words, the distance between the individual words of a line and the individual lines of a paragraph can be determined later as shown at step 116.

This line and word separation information is used to specify how lines and words are spaced when written to a destination; in particular how they are separated. Thus, when writing the words in the paragraph to a destination, the words are separated from one another by defined word separation distances in destination lines and the destination lines are separated from one another by defined line separation distances. In addition, the parameters of the destination medium such as its margins and justification specify the arrangement of lines and words in the destination. As mentioned, the destination may be the dual-function screen on which the inked objects were originally written, or it may be another medium such as a CRT or a printed page. Each of these will have different display regions defined by margins, etc. Thus, before the words of the text paragraph are written to the destination, a starting baseline, and left and right margins must be set in the destination. At step 118, the baseline is initialized to zero, left margin set to zero, and the right margin set to the destination width, all in a Cartesian coordinate system. An iterative loop step 124 initializes a counter i to 1 and compares it to the variable W. If i is less than or equal to W, a word(i) is written to the destination as shown at step 120. As noted at step 120, each is word is written along a baseline and between the left and right margins in the destination. Step 124 then iterates the counter i by 1, and the loop 120/124 continues until i is greater than W, at which point the process is completed at step 122.

Figure 10A:
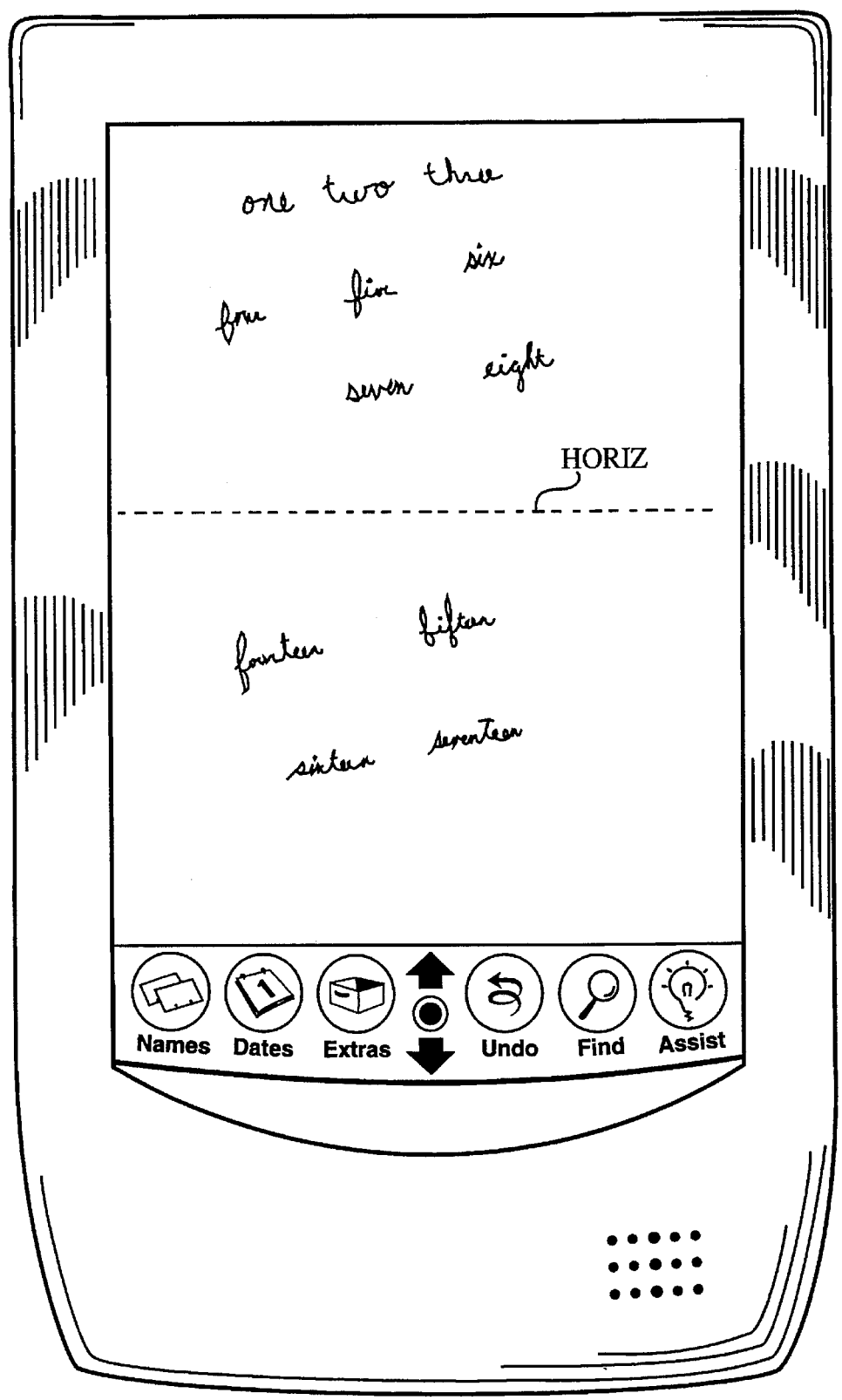
FIGS. 10a and 10b are diagrams showing how handwriting on dual-function display is reformatted and written to a destination.
Figure 10B:
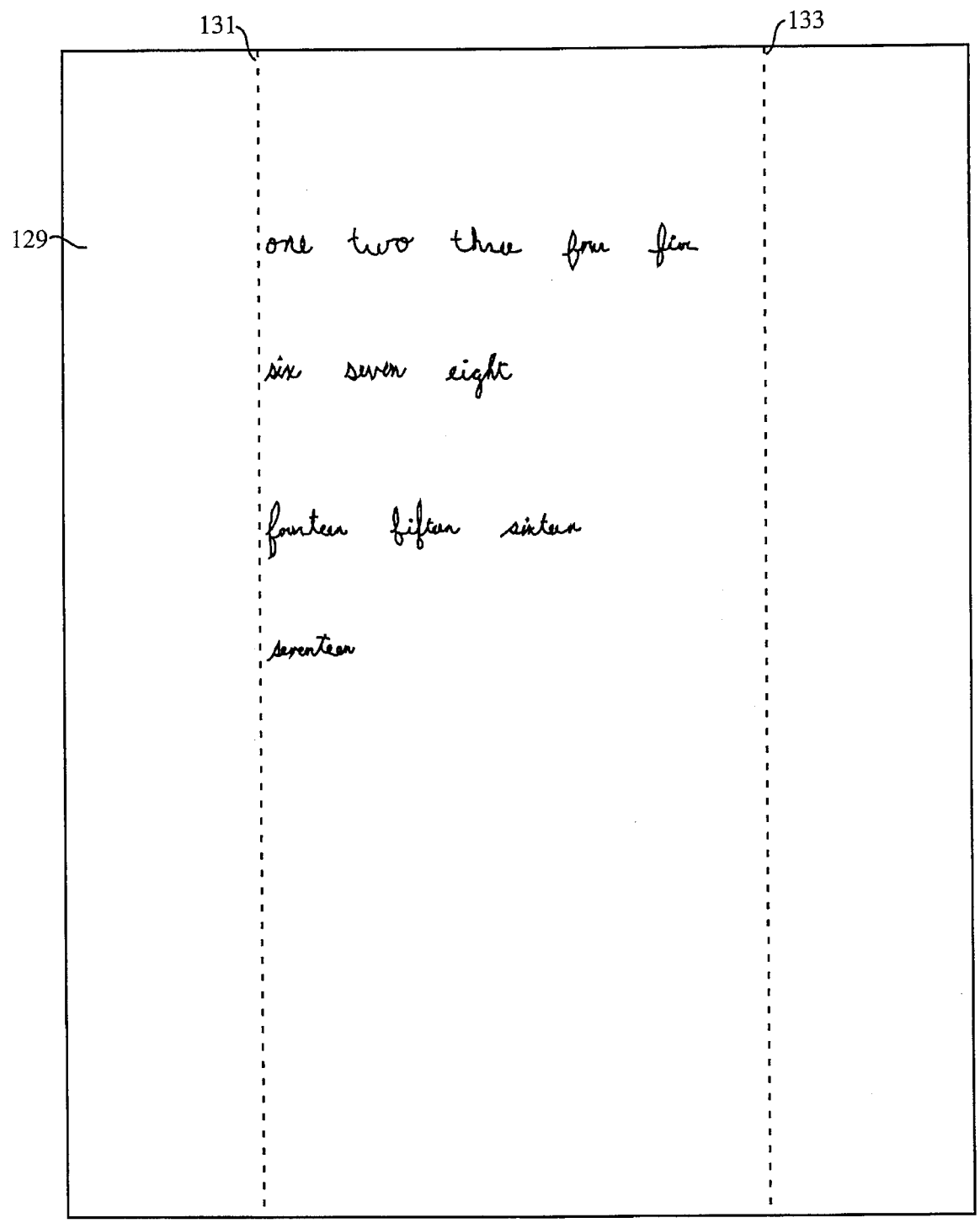

FIG. 10 provides an example of how a crudely written text paragraph may be reformatted and written to a destination according to the present invention. FIG. 10a shows a sample of ink objects written on a pen-based computer display. As can be seen, the individual words (ink objects) are separated from one another by varying distances. Further, the individual lines are written at an angle with respect to the horizontal HORIZ. In FIG. 10b, those same words have been reformatted so that they are written between the left margin 13 1 (set to zero) and the right margin 133 (set to the destination width) on a sheet of paper. The words are also written so that they are separated by equal spacing. The words have been divided into two paragraphs: the first represented by the words "one" through "eight", and the second represented by the words "fourteen" through "seventeen".

Figure 11:
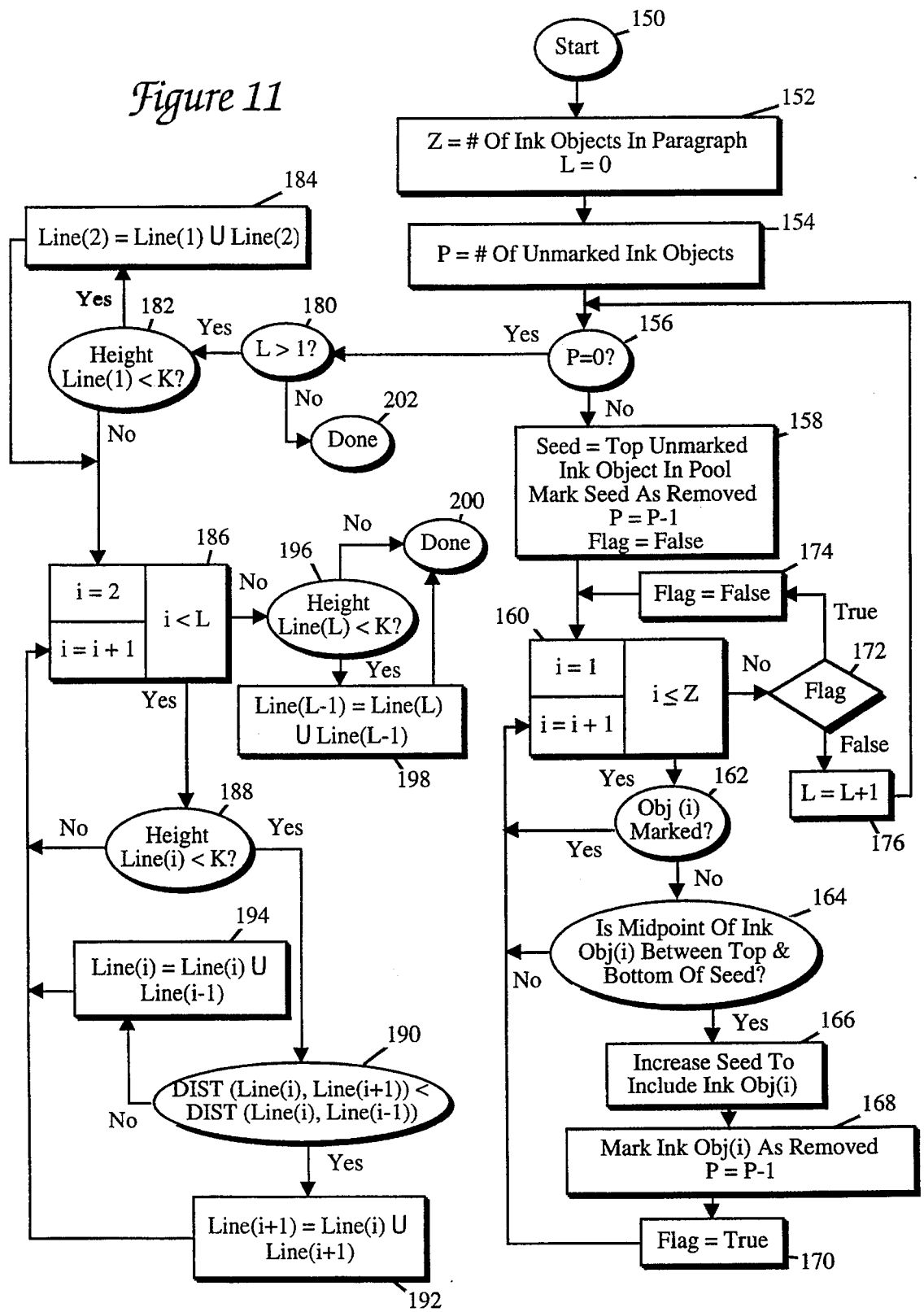
FIG. 11 is a flow diagram illustrating how ink objects in a paragraph are partitioned into lines.

The procedure for roughly partitioning a paragraph into lines (step 112 of FIG. 9) is shown in FIG. 11. The procedure takes place in two major steps. First, groups of ink objects separated from other groups by specified distances are identified as lines. Next, those lines that are particularly thin are joined with the closest adjacent line. This allows the system to combine underlining and after strokes (e.g. the horizontal line in a capital "T") with the appropriate words.

The process begins at step 150 and sets a variable "Z" equal to the number of ink objects in the paragraph (step 152), a variable "L" equal to zero (L represents the number of lines in a paragraph), and a variable "P" equal to the number of the unmarked ink objects in the paragraph (step 154). Typically P will be equal to the variable Z at the outset as each ink object is generally unmarked. However, as the process proceeds, each new ink object added to a line is marked and eventually the value of P reaches zero as detected at step 156. If P does not equal zero a step 156, a step 158 designates the topmost ink object as a "seed" for the first line. In addition, that ink object is marked as removed and a flag is set equal to false. Steps 160, 162, 164, 166, 168, and 170 represent a loop in which the ink objects are sequentially evaluated to determine if they should be added to the current line. An iterative loop step 160 initializes a counter i to 1 and compares it to the variable Z. If i is less than or equal to Z, decision steps 162 and 164 together process steps 166, 168, and 170 determines whether word(i) should be added to the current line. Specifically, at step 162, the object is evaluated to see whether it is marked. If so, it is ignored and process control returns to iterative loop step 160 where the next ink object is considered. If however, the object is unmarked, the system proceeds to step 164, where the midpoint of the object is compared with the top and bottom of the seed. If the midpoint of the object under consideration falls between the top and bottom of the seed, that object is added to the seed as shown at step 166. If, however, the midpoint of the object under consideration falls outside of the seed, that object is not added to the current line and process control returns to iterative loop step 160 where the next ink object in sequence is evaluated. Whenever an object is added to the current seed, it is marked as removed at Step 168 and the flag is set equal to true at step 170. After every object in the paragraph is evaluated, i.e., after step 160 determines that i is greater than Z, the status of the flag is determined at step 172. If the flag is now true, as it must be if any objects were added to the seed, the flag is reset to false at step 174 and the system re-enters the loop beginning at iterative loop step 160. By re-entering the loop, ink objects that should have been included in the line but were evaluated before the seed had become sufficiently large are now captured and added to the line.

This procedure of repeatedly entering the loop for a given line is especially important if the user writes at an angle as illustrated in FIG. 12 (discussed below). At some point, the system will have caught each object that belongs in the current line. The next loop (comprising steps 160–170) after that point will capture no further ink objects and the flag will remain set to false (because process control never passes through step 120). Now, when the system evaluates the flag at Step 172, it will move to Step 176 where the current line L is incremented by one. The logic then loops back to Step 156 to determine whether each of the objects in the paragraph has been marked. If not, a new seed is identified at Step 158 and the procedure is repeated to define a second line. This continues until each ink object in the paragraph has been marked and thereby added to a line.

After each ink object in the paragraph has been marked, the system begins the second major part of the procedure in which thin lines are combined with adjacent thicker lines. First, at step 180, the system determines whether there is only a single line in the paragraph. If so, there is no need to combine it with another line, and the procedure is completed at step 202. More typically, there is more than one line in a paragraph. If so, the height of the first line is evaluated to see if it is below a preset value, "K" at decision step 182. In preferred embodiments, "K" is between about 0 and 8 mm, and more preferably between about 0 and 6 mm. Should the height of line 1 be less than "K", line 1 is joined with line 2 at step process 184. At this point, the system moves to a loop which begins at iterative loop step 186. Step 186 initializes a line counter i to 2 (the second line) and determines whether i is less than L. If i is less than L, the logic evaluates the current line to determine whether its height is less than "K" at step 188. If not, the system ignores it and returns to the beginning of the loop at step 186 where the line counter is incremented by 1. If, on the other hand, the line under consideration is sufficiently thin, the system determines whether it is closer to the line immediately above it or immediately below it at decision step 190. If it is closer to the line above it—as is the case for underlining—it is joined with the line above it at Step 192. If the line happens to be closer to the line below it—as would be the case with the horizontal cross of a capital "T"—the line under consideration is joined with the line below it at step 194. When the last line in the paragraph is considered at decision step 196 (i.e., i=L), it is joined with the line immediately above it at Step 198 if it is sufficiently thin. The process is then completed at Step 200.

FIG. 12 provides an example in which eight ink objects are divided into two lines. As shown in FIG. 12a, the ink objects—depicted as rectangular bounding boxes—are not written along straight lines. The numerals in the bonding boxes indicate the order in which the objects were written, with one representing the first written object and eight representing the last written object.

Figure 12D:
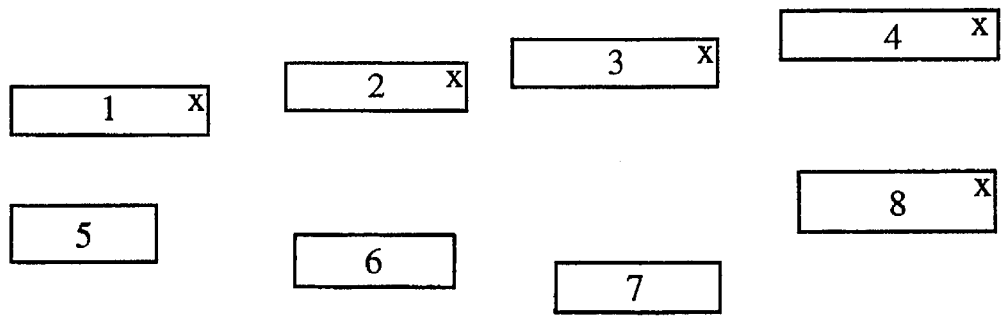
Figure 12E:
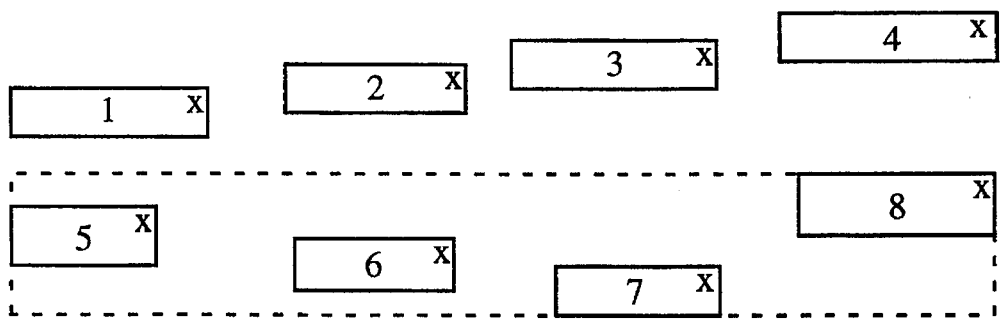

In FIG. 12a, the topmost ink object, object 4, is identified as the seed and marked as removed. The "x" in the bounding box of object 4 indicates that it has been removed. At this point, each inked object is evaluated to see if it should be added to the seed. The process is begun with ink object 1 and proceeds to ink object 8. Objects 1 and 2 are not added to the seed because their midpoints do not fall within the bounding box of the current seed, object 4. Object 3, however, is added to the seed because its midpoint does fall within the bounding box of object 4. The new seed is represented by the dashed lines in FIG. 12b. Objects 5 through 8 each fall outside of the seed. At this point, the first loop is completed and a second loop is begun to capture any ink objects that may have been missed in the first loop. The second loop catches object 2 which has a midpoint falling within the boundaries of the seed defined by objects 3 and 4. A third loop is required to capture ink object 1 and added to the seed as shown in FIG. 12c. A fourth loop indicates that no further objects can be added to the seed. Therefore, the first line is defined by objects 1 through 4. The system then identifies a new seed—object 8—for the second line as shown in FIG. 12d. In a single loop, the remaining objects are added to the seed as shown in FIG. 12e, thus defining a second line.

Figure 13:
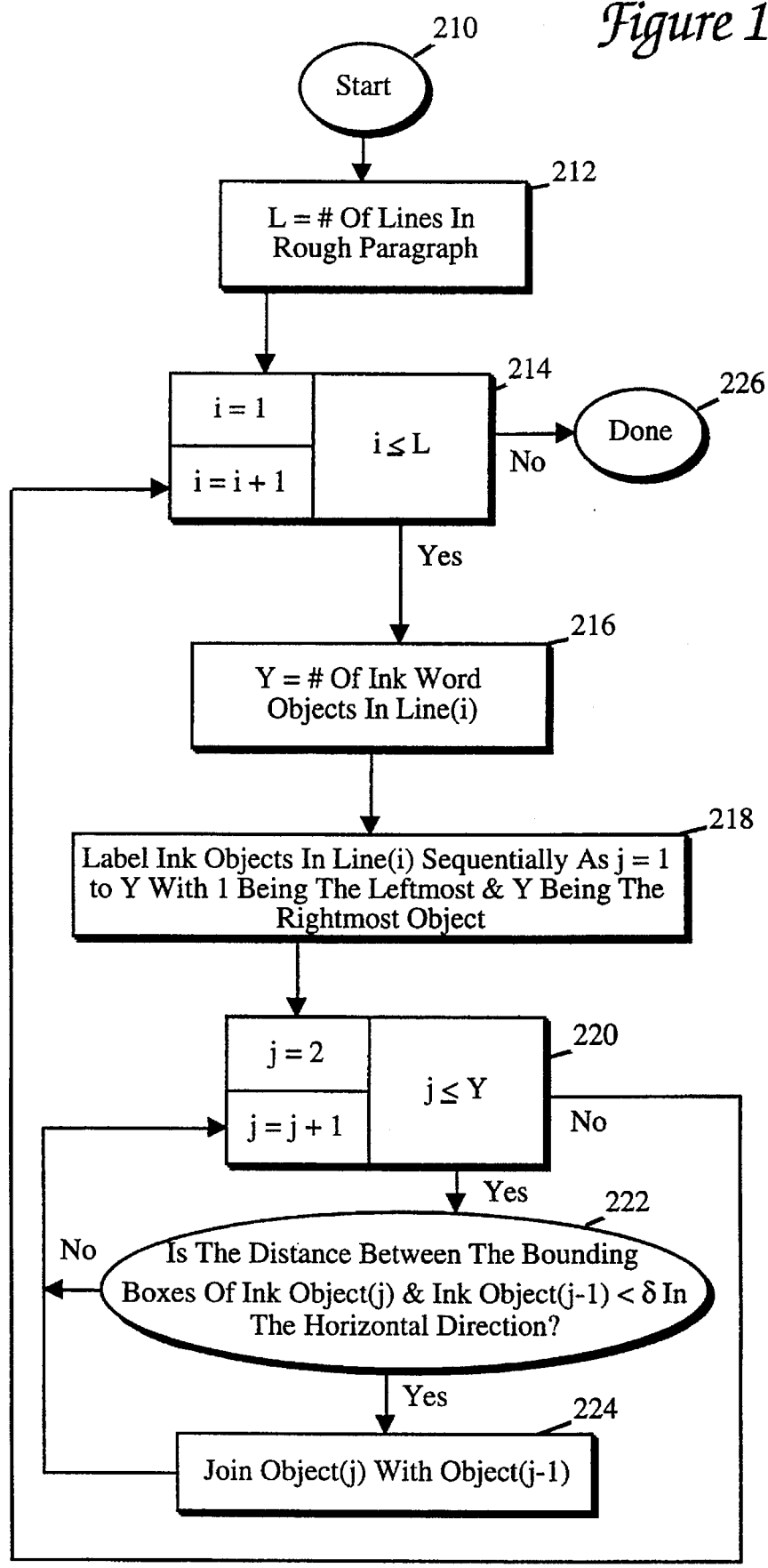
FIG. 13 is a flow diagram illustrating how ink objects are combined or divided to form ink words.
Figure 14A:
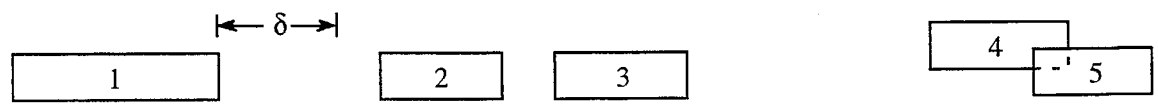
FIGS. 14a–14d are diagrams showing how a hypothetical collection of ink objects (represented by bounding boxes) would be partitioned into lines.
Figure 14B:
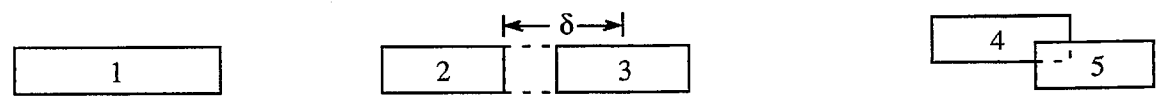
Figure 14C:
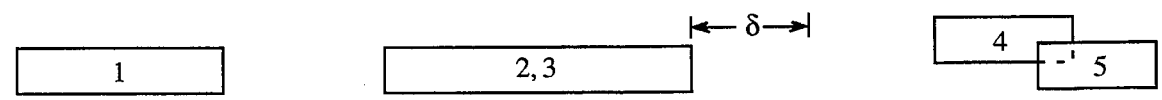
Figure 14D:

Ink objects in the paragraph that are close to one another are combined to form word objects. This is shown as step 114 of FIG. 9 and in more detail in FIG. 13. The process begins at step 210 and continues at step 212 where the number of lines L in the paragraph is defined. Next, the system loops through each line in the paragraph beginning at step 214 and ending at step 226 when the last ink object of the last line is evaluated. Iterative loop step 214 initializes a line counter i to 1 and compares it to the variable L. If i is less than or equal to L, the logic defines the number of ink objects Y in the current line (line (i)) is defined at step 216. Next, the ink objects of that line are labeled sequentially from the leftmost object to the rightmost object at step 218. Then each object of the current line (line(i)) is evaluated in the loop depicted by steps 220, 222, and 224. Iterative loop step 220 initializes a word counter j to 2 (the second word in line(i)) and compares it to the variable Y. So long as j is less than or equal to Y, the logic determines the distance between the bounding boxes of adjacent ink objects at step 222. If this distance is less than a predefined value, $\delta$, then the two ink objects are joined to form a word as shown in Step 224. In preferred embodiments, the value of $\delta$ is about 5 mm, and more preferably about 2.5 mm. If the distance between the bounding boxes of two adjacent ink objects is greater than $\delta$, the objects are not combined and the system loops back to consider the next ink object at Step 220. When the last word in line (i) (j=Y) is evaluated, process control returns to iterative loop step 214 where the next line is considered (i is incremented by 1). The above process is repeated until the last line (i=L) is processed. At this point, the process is completed at step 226.

This procedure is illustrated in FIG. 14. In FIG. 14a, it is seen that the distance between ink objects 1 and 2 is greater than $\delta$. Therefore, these objects are not combined. In FIG. 14b, the distance between ink objects 2 and 3 is less than $\delta$, so these objects are combined to form a new word. In FIG. 14c, the distance between this new word and ink object 4 is greater than $\delta$, so object 4 is not added to the new word. Finally, in FIG. 14d, the ink objects 4 and 5 overlap, so their separation is obviously less than $\delta$, and these objects are combined to form another new word. As shown, the bounding box of object 4 is somewhat higher than the bounding box of object 5. This might occur in the case where object 4 is the cross of a "T" for example.

Figure 15A:
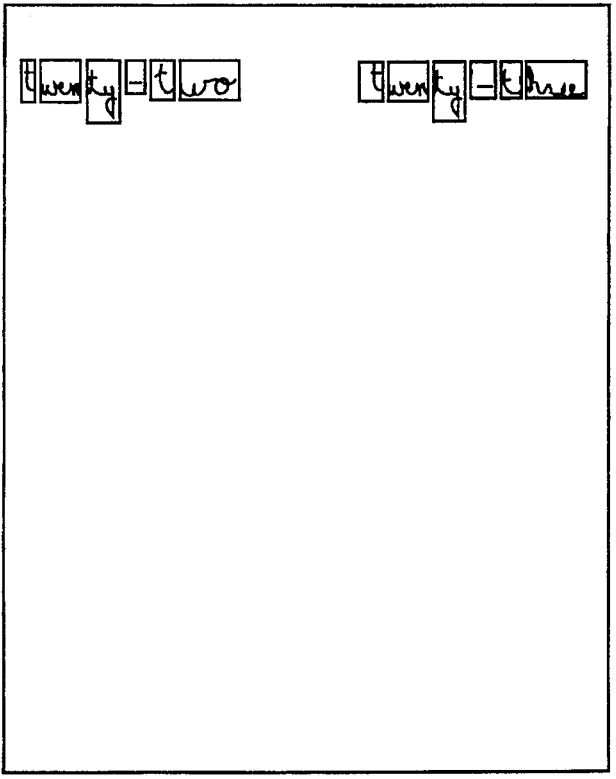
FIGS. 15a and 15b are diagrams showing how ink objects in the handwritten words "twenty-two" and "twenty-three" would be combined to form words.
Figure 15B:
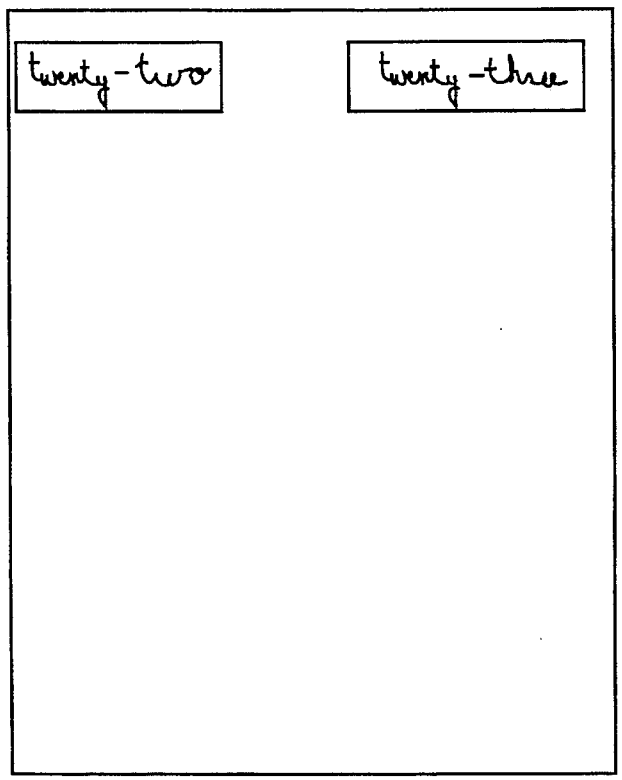

FIG. 15 shows how this procedure might be implemented with particular words. In FIG. 15a, the words "twenty-two" and "twenty-three" are shown as divided (by spacing) into six ink objects each. Because the individual ink objects which comprise each written word are closely spaced, the objects are combined to form two words as shown in FIG. 15b.

Figure 16:
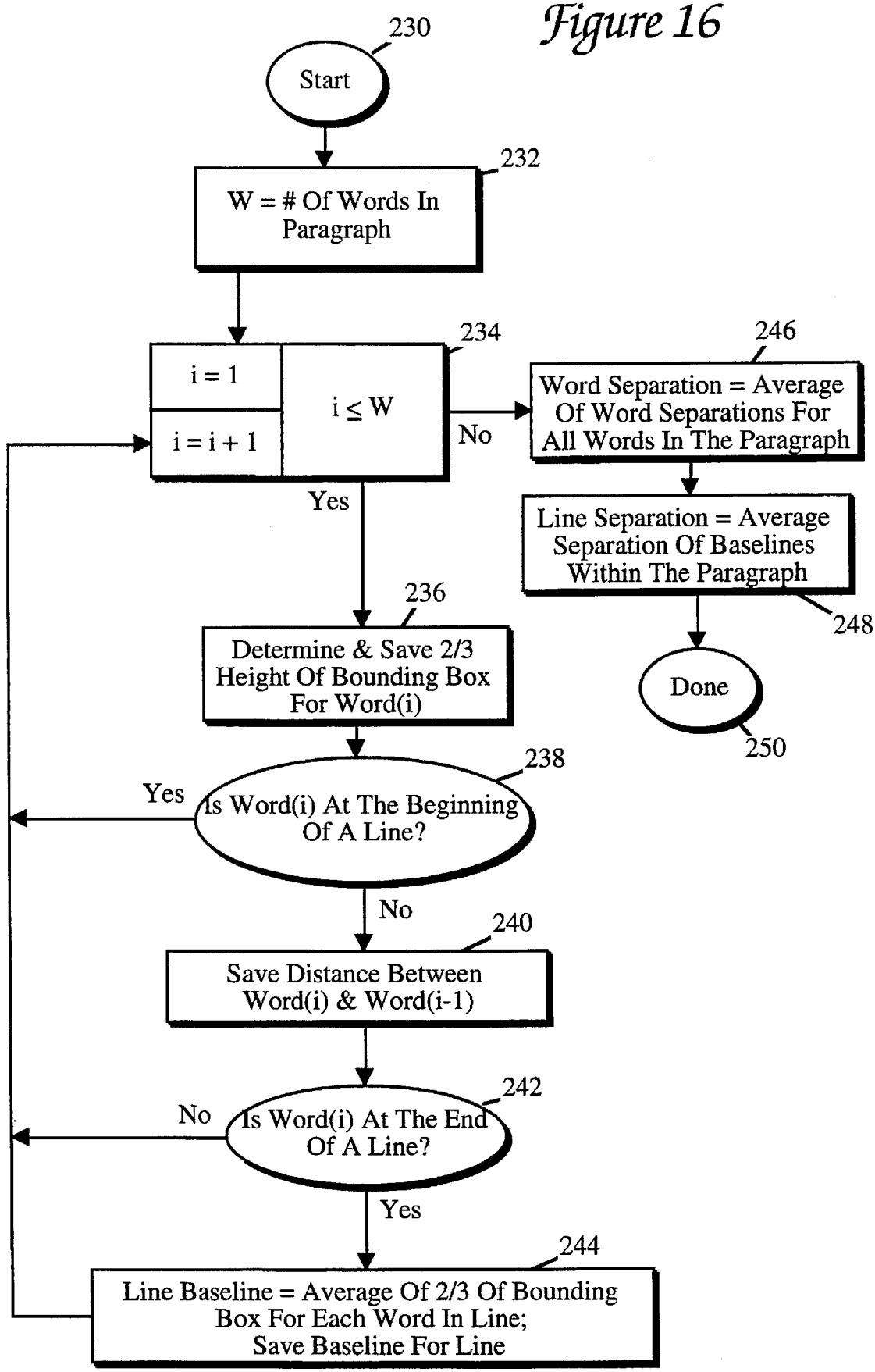
FIG. 16 is flow diagram illustrating how the word and line spacing employed in the destination are determined.

Before a paragraph can be written to a destination in the embodiment shown, the word and line spacing are determined. In a preferred embodiment of this invention, those values are determined from the position of the words as they are written by the user. Alternatively, they could be predetermined by the destination format or by a user setting (e.g., ¼-inch line spacing). This procedure is noted at step 116 of FIG. 9 and, in more detail, in FIG. 16. The process is started at step 230 and then the number of words W in the paragraph is defined at step 232. At this point, an iterative loop step 234 begins in which each word of the paragraph is evaluated and then used to define an average word spacing and an average line spacing. Initially, a word counter i is set to 1. Each time process control returns to iterative loop step 234, the word counter is incremented by 1 and checked to ensure that it remains less than or equal to the value of the variable W. At step 236, the value of two-thirds of the bounding box height for the word under consideration is saved. This value is later used to determine a baseline for the line on which the word appears. At decision step 238, the word is evaluated to determine if it appears at the beginning of a line. If so, process control returns to iterative loop step 234 and the next word is considered. If, on the other hand, the word appears embedded within a line, the distance between it and the previous word (word(i-1)) is determined and saved at step 240. Then, if the word does not appear at the end of a line, decision step 242 returns the system to iterative loop step 234 where consideration of the next word begins. When the last word of the line is reached, decision step 242 directs process control to step 244 where the current line baseline is calculated from the average of two-thirds of the bounding boxes for each word in the line. The line baseline is saved for further use in calculating the line separation and process control returns to iterative loop step 234. When each word in the paragraph has been evaluated according to the above procedure (i is not less than or equal to W), the system moves from iterative loop step 234 to step 246 where the word separation is calculated as the average of all word separations in the paragraph. Next, at step 248, the line separation is calculated as the average of the distance between each line and the subsequent line in the paragraph. At this point, the process stops as indicated at step 250. In some embodiments, the word and line spacings may be derived from the text of the entire page rather than just from the text of one paragraph.

Figure 17:
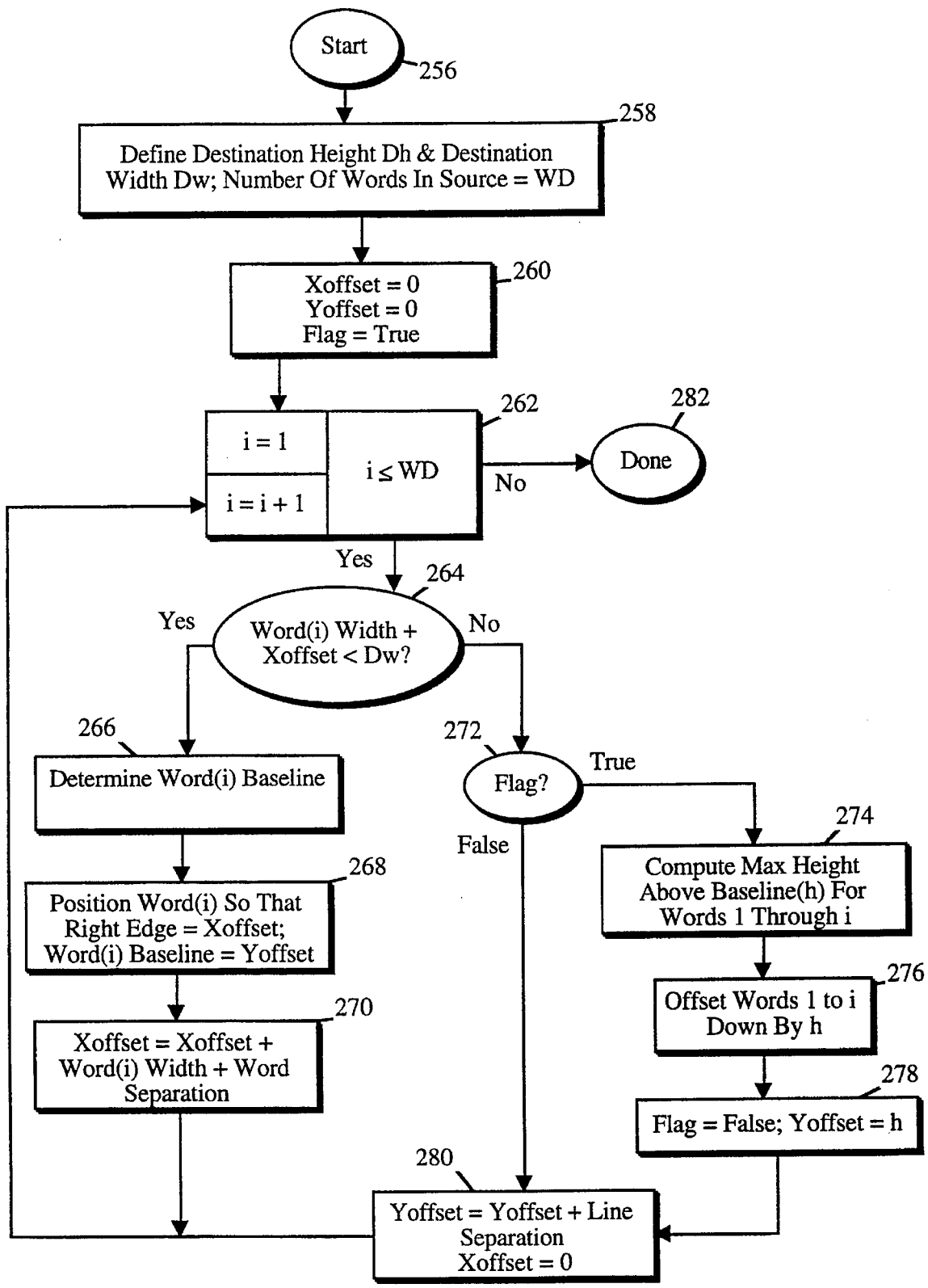
FIG. 17 is a flow diagram illustrating the steps used to write ink words from a source to a destination.
Figure 18A:
FIGS. 18a and 18b are diagrams showing how the word and line spacing of a group of words might be reflowed according to this invention.
Figure 18A:
Figure 18A:
Figure 18B:
Figure 18B:
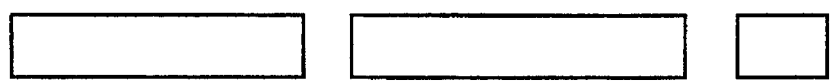
Figure 18B:

At this point, the system is ready to write the words of the paragraph to a destination as shown in FIG. 17 and noted at steps 120 and 124 in FIG. 9. This process begins at step 256 and then moves to define the parameters Dh (destination height), Dw (destination width), and WD (the number of words in source). Dh and Dw depend, of course, on the size of the destination and the position of the words within that destination. To keep track of the position of words within the destination as new words are added, the parameters Xoffset and a Yoffset are defined. At step 260, both of these parameters are initialized to zero. This means that the first word will be inserted at the top left position of the destination. Also, a flag is set to true at step 260. Now the system begins looping through each word in the source at iterative loop step 262. Iterative loop step 262 initializes word counter i to 1 and checks to ensure that i less than or equal to the variable W. Words will only be added to a line until the next successive word would exceed the destination width. Thus, from iterative loop step 262, process control moves to decision step 264 which determines whether the current word's width plus the Xoffset will be less than the destination width. If the word can be added to the current line, step 266 determines its baseline. Then step 268 positions the word so that its right edge equals the current value of the Xoffset. In addition, step 268 sets the word's baseline equal to the current value of the Yoffset. Next, at step 270, the Xoffset is reset as the sum of the current value of the Xoffset plus the current word's width plus the word separation magnitude. Process control then returns to iterative loop step 262 where the word counter i is incremented by 1. In this manner, each succeeding word is treated until the destination width is exceeded. At that point, decision step 264 directs the system to step 272 where, the flag is evaluated. If the flag is true—as it must be when the first line is considered—step 274 determines a special vertical offset, h. This offset is equal to the maximum height by which any one word of the first line exceeds its own baseline. Next, at step 276, all the words of the first line are offset by the distance h, and at step 278, the flag is reset to false and the Yoffset is set to h. Next, at Step 280, the Yoffset is reset to the sum of the Yoffset plus the value of the line separation. In addition, the Xoffset is reset to zero and process control returns to iterative loop step 262 where the word counter is incremented by 1. The system is now ready to write words to the second line of the destination. Succeeding words are written to the second line of the destination much as they were written to the first line. However, the Yoffset is now at a lower position on the destination. When the second line of words has been written, decision step 264 again directs the system to step 272 where the flag is evaluated. This time, the flag must be false. Then, the Yoffset is reset at Step 280 and the system returns to write, the third and each successive line of words to the destination. When the final word in the source is written, the process is completed and iterative loop step 262 directs process control to end step 282.

FIG. 18 shows how words and lines originally written with unequal spacing are reflowed according to the present invention. FIG. 18a shows the bounding boxes for a series of words as they might be written by a user. In FIG. 18b, the positions of the bounding boxes have been adjusted according to this invention so that the spacing between each word is identical. In addition, the spacing between each line is identical.

Figure 19:
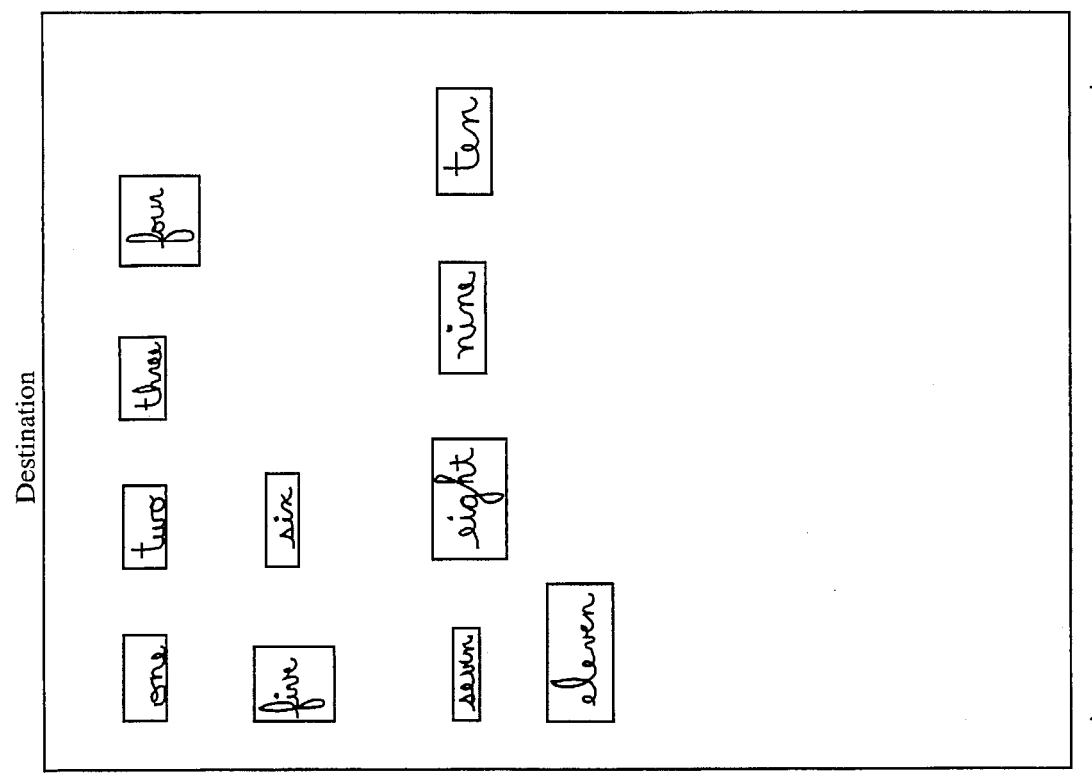
FIG. 19 is a diagram showing how the number of words in a line can change when writing to a destination.
Figure 19:
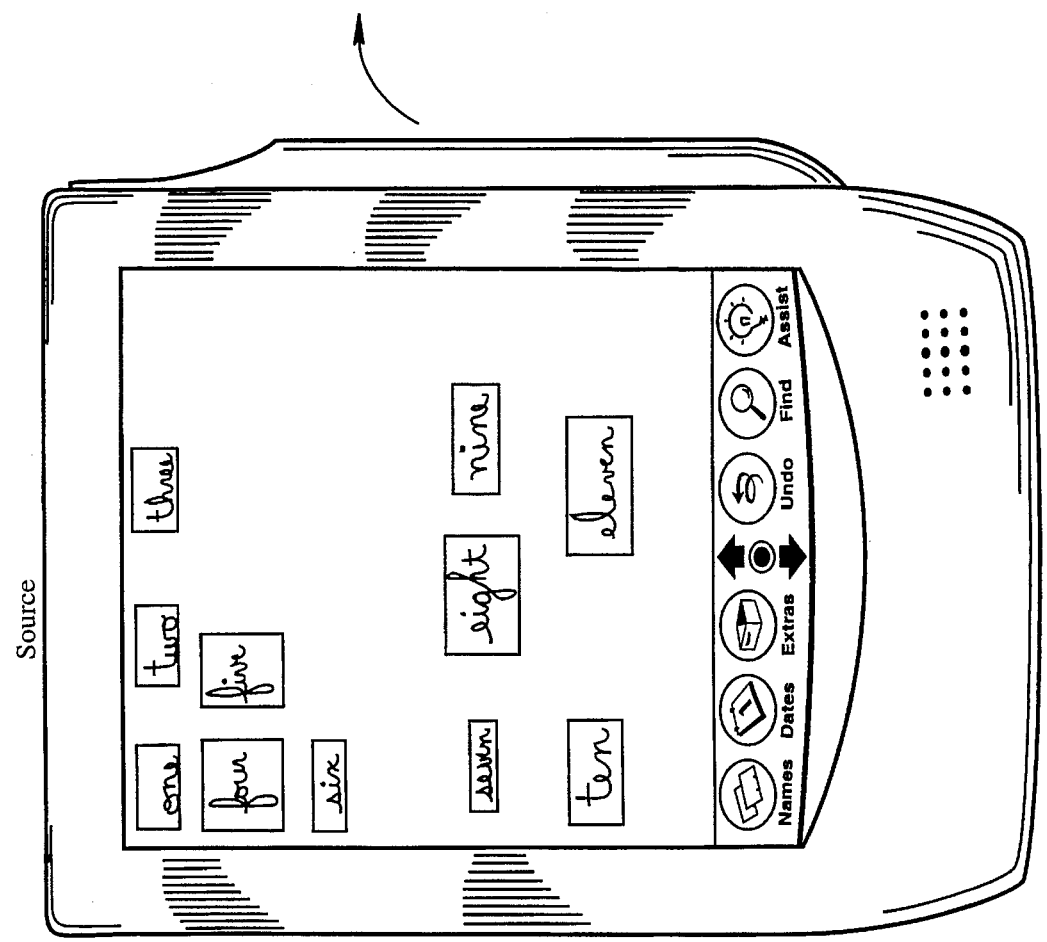

FIG. 19 illustrates how a series of words might be written to a destination when the destination has a width greater than the source width. In this example, the words "one" through "six" are written in one paragraph of three lines. These words are rewritten to the destination as a paragraph of two lines. The second paragraph containing the words "seven" through "eleven" is also rewritten according to the present invention.

Figure 20:
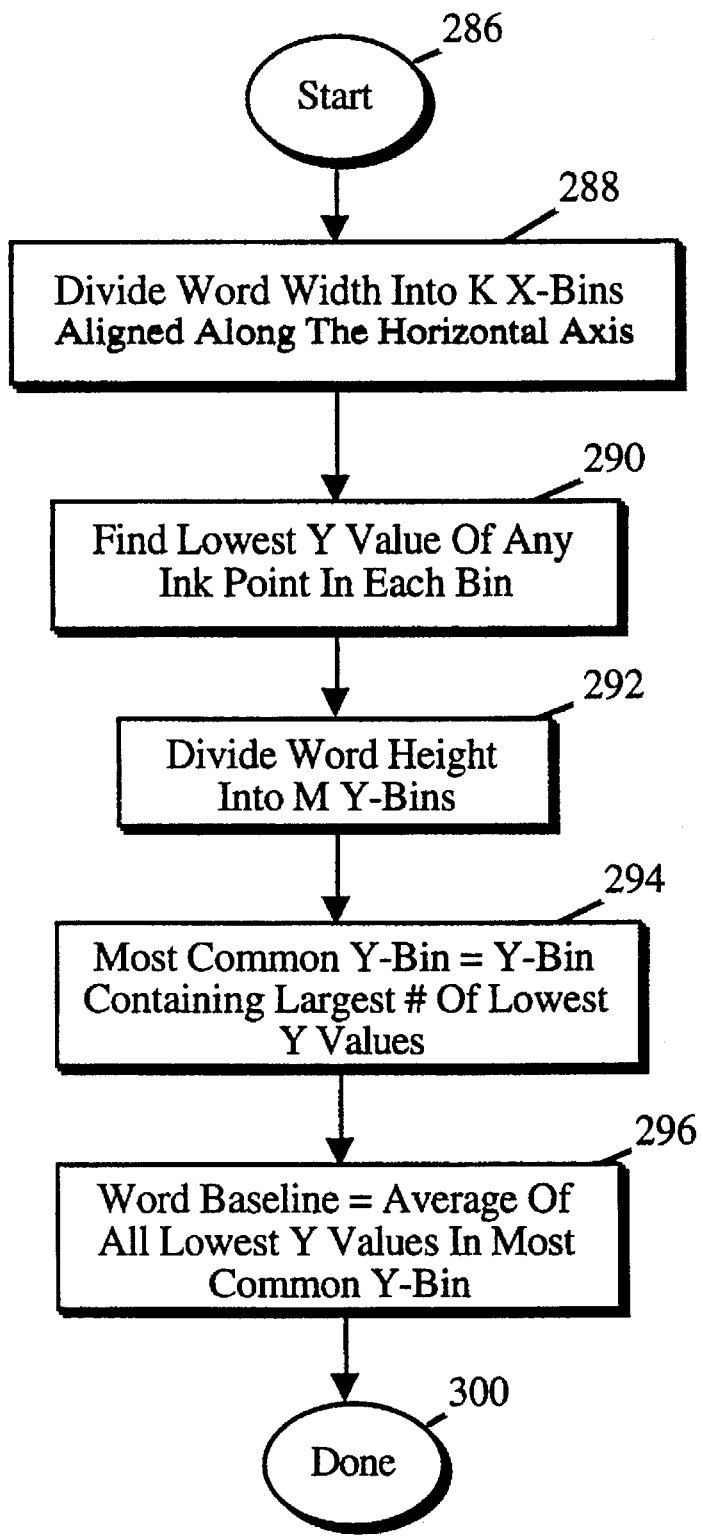
FIG. 20 is a flow diagram showing how a baseline is identified for ink words.

As indicated at step 266 of FIG. 17, the system must determine the baseline for each word so that the word can be aligned with the current value of Yoffset. This procedure is illustrated in FIG. 20. The process begins at step 286. First, the current word "bounding box width" is divided into a series of vertical sections ("K X-Bins") aligned along the horizontal axis. This step is depicted at block 288. Next, for each vertical section, the system finds the lowest Y value of any ink point appearing therein. This step is depicted at block 290. The word is then divided into a series of horizontal slices ("M Y-Bins") at step 292. The horizontal slices are compared at step 294 to determine which contains the largest number of lowest Y values. The actual word baseline is calculated at step 296 by averaging the lowest Y values in the horizontal slice containing the greatest number of such values. Thereafter, at step 230, the process is completed.

Figure 21A:
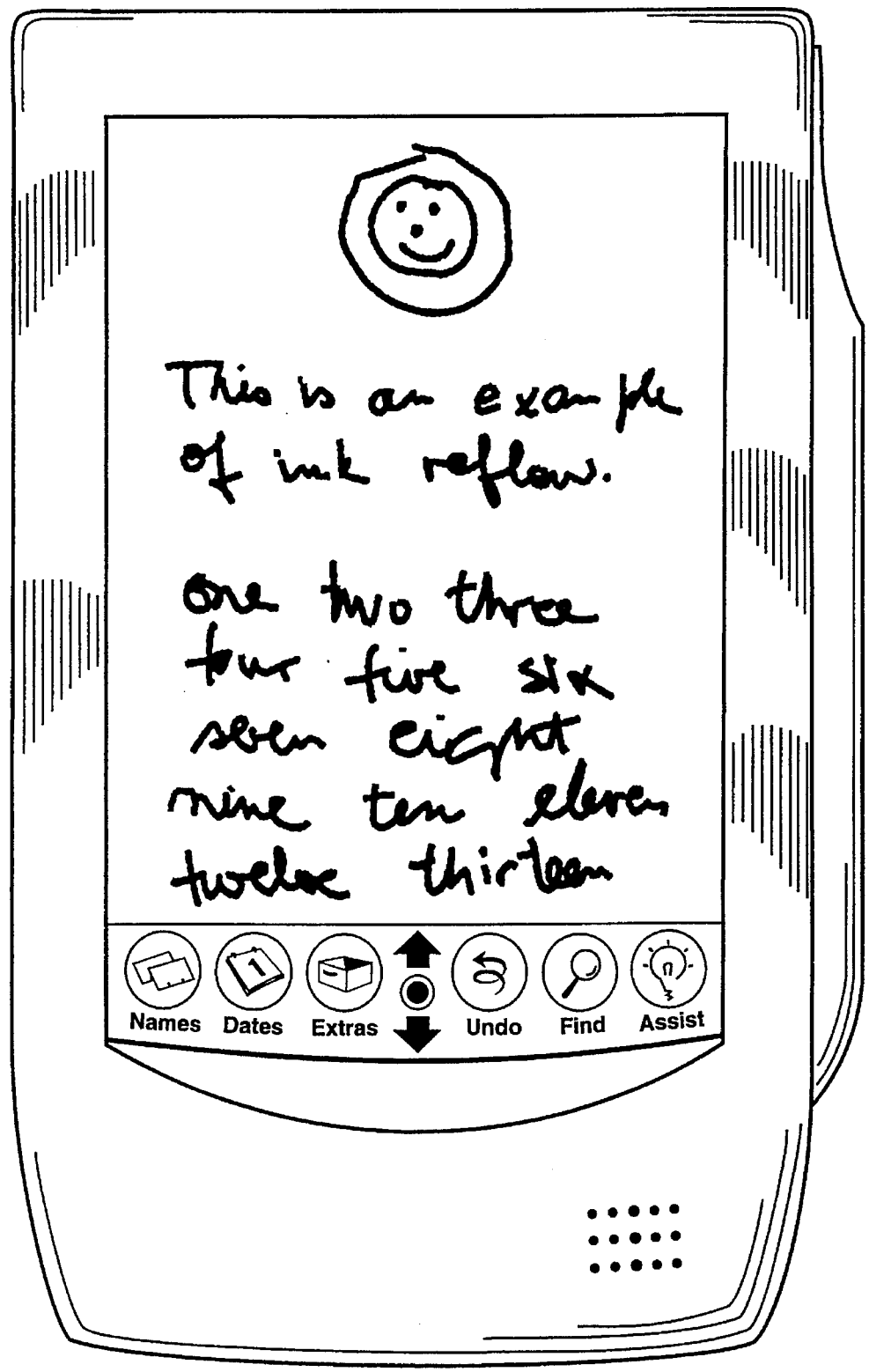
FIGS. 21a and 21b are actual examples of a handwritten note as originally written and that same note reflowed according to the present invention.
Figure 21B:

FIGS. 21a and 21b show an actual example of text and graphics paragraphs that have been reflowed according to the present invention. As shown in FIG. 21a, the information originally inked on the source is provided as seven lines of text and a "smiley face" graphic. In FIG. 21b, the handwritten information has been reflowed in a destination to form paragraphs in which text is now provided as two paragraphs (one of 1 line and the other of three lines) and the graphic is now centered. Because the destination is larger than the source, the destination lines contain more words than the source lines. It should be noted that the size, shape, and other features of the individual ink objects written in the source have not been altered in the destination.

While this invention has been described in terms of several preferred embodiments, there are alterations, permutations, and equivalents which fall within the scope of this invention. It should also be noted that there are many alternative ways of implementing the processes of the present invention. For example, many of the parameters defined herein can be varied for different formatting options. For example, the line and word spacings in a destination paragraph can be set such that they vary within the paragraph. This might result if the destination paragraph is center justified, for example. Further, the above disclosure is directed to Roman-style writing, but similar techniques could be applied to Asian-style writing with appropriate modification of the dimensions.

It is therefore intended that the following appended claims be interpreted as including all such alterations, permutations, and equivalents as fall within the true spirit and scope of the present invention.

What is claimed is:

1. A method of formatting ink objects written with a pointer on an input tablet of a computer system, an ink object being handwritten information displayed as handwriting, the method comprising the following computer implemented steps:

(a) partitioning the ink objects entered on the input tablet coupled to the computer system into paragraphs by identifying groups of ink objects separated from other groups by at least a predefined vertical distance, each such group constituting a paragraph;

(b) automatically determining whether each identified paragraph is a text paragraph or a non-text paragraph, a text paragraph being a group of words separated from other paragraphs on the input tablet by at least said predefined vertical distance;

(c) formatting text paragraphs according to a text formatting protocol and formatting non-text paragraphs according to a non-text formatting protocol, said text and non-text formatting protocols employing different rules; and (d) outputting the formatted non-text paragraphs and text paragraphs over an output device coupled to said computer system wherein the outputted paragraphs include said ink objects displayed as handwriting.

2. The method of claim 1 wherein the predefined vertical distance is between about 0 and 10 mm.

3. The method of claim 1 wherein the ink objects are partitioned into paragraphs by the following steps:

(i) defining bounding boxes around the individual ink objects which are not already in paragraphs, each bounding box having a top and a bottom;

(ii) from among the ink objects specified in step (1), identifying the top most located ink object on the input tablet designating that ink object's bounding box as a seed, and marking that ink object as removed;

(iii) for each additional ink object not already in a paragraph, increasing its bounding box height by a defined amount, determining whether the top of its bounding box is higher than the bottom of the seed, and when the top of its bounding box is higher than the bottom of the seed, increasing the seed to include its bounding box, and marking the ink object as removed; and (v) repeating steps (ii) and (iii) until all ink objects are marked.

4. The method of claim 1 wherein paragraphs containing more than a predefined percentage of ink objects of size greater than a predetermined magnitude are designated as graphics paragraphs.

5. The method of claim 1 the non-text paragraphs comprise at least one graphics paragraph and wherein paragraphs containing an ink object of size greater than about 10 mm are designated as graphics paragraphs.

6. The method of claim 1 wherein the non-text formatting protocol includes a protocol for formatting graphics paragraphs and the graphics formatting protocol includes a step of centering the graphics paragraph.

7. The method of claim 1 wherein the text formatting protocol includes the following steps:

(i) grouping the ink objects of the text paragraph into lines, each separated from other lines by a predetermined line separation distance; and (ii) writing the lines to a destination such that the objects in the line are aligned on a predefined baseline on the destination.

8. The method of claim 7 further comprising a step of grouping the ink objects of a line into words, each word separated from the other words on its line by a predefined word separation distance.

9. The method of claim 1 further comprising the steps of:

(e) partitioning the ink objects within a paragraph into one or more lines by identifying groups of ink objects separated from any other groups in one direction by at least a predefined line distance, each such group constituting a line;

(f) partitioning the ink objects in the one or more lines into words displayed in handwritten form;

(g) separating the words in the one or more lines by defined word separation distances;

(h) separating the one or more lines in the paragraph by defined line separation distances when there is more than one line; and (i) writing the words in the paragraph to a destination such that the words are aligned in one or more destination lines, wherein the one or more destination lines are separated from one another by the defined line separation distances when there is more than one destination line, and wherein the words in each destination line are separated from one another by the defined word separation distances.

10. The method of claim 9 wherein the words have bounding boxes and are partitioned into one or more lines by the following steps:

(i) identifying the topmost located ink object displayed on the tablet within said paragraph, designating that ink object's bounding box as a seed, and marking that ink object as removed, provided the seed is not already in a line;

(ii) for each additional unmarked ink object, determining whether its midpoint is located between the top and the bottom of the seed, and when the midpoint is so located, increasing the seed to include the ink object's bounding box and marking the ink object as removed;

(iii) repeating step (ii) until no new ink objects are added to the seed during step (ii), the ink objects within the seed being designated as a line; and (iv) repeating steps (ii) through (iv) until all ink objects are marked.

11. The method of claim 10 further comprising the following steps:

(v) identifying thin lines having a height less than a preset line height; and (vi) joining thin lines with the closest adjacent line.

12. The method of claim 10 wherein the seed is rectangular.

13. The method of claim 9 wherein the ink objects are partitioned into words by the following steps:

(i) determining the distance between two sequential ink objects in a line; and (ii) joining two sequential ink objects when the distance between them is less than a predetermined value of about 5 mm.

14. The method of claim 9 further comprising the following steps:

(i) determining an average word distance between the words in each line of the paragraph;

(ii) setting the defined word separation distances equal to the average word distance;

(iii) determining an average line distance between each line in the paragraph; and (iv) setting the defined line separation distances equal to the average line distance.

15. The method of claim 9 wherein the words have bounding boxes of defined lengths and the step of writing the words in the paragraph to a destination comprises the following steps:

(i) defining a destination width for each destination line;

(ii) writing words to the destination in the order in which they appear in the writing medium such that the words written to a destination line are separated from adjacent words by the defined word separation distances, wherein the words are written to the destination line until adding an additional word would cause the sum of the word bounding box lengths and the word separation distances to exceed the destination width for the destination line.

16. The method of claim 15 wherein the destination lines are left justified.

17. The method of claim 16 wherein the topmost destination line is indented.

18. The method of claim 15 wherein the words are written to more than one destination line, each of which has a baseline separated from the baselines of other destination lines by the defined line separation distances.

19. The method of claim 18 wherein the defined line separation distances are identical for each line baseline.

20. The method of claim 18 further comprising the following steps:

(i) defining baselines of the words; and (ii) writing words to the destination such that the words' baselines are aligned with the destination line baselines.

21. The method of claim 20 wherein the step of defining the baseline of a word includes the following steps:

(iii) dividing the word bounding box into a plurality of vertical sections along a horizontal axis;

(iv) identifying the lowest vertical position of any ink object in each vertical section;

(v) dividing the word bounding box into a plurality of horizontal sections along a vertical axis;

(vi) identifying the horizontal section containing the greatest number of lowest ink object vertical positions; and (vii) defining the word baseline in the horizontal section identified in step (vi).

22. The method of claim 9 wherein the defined word separation distances are equal to a preset value.

23. The method of claim 9 wherein the defined line separation distances are equal to a preset value.

24. The method of claim 1 wherein the output device is a screen on which the user writes ink information.

25. A system for reformatting ink information written by a user using a pointer on a tablet of a computer system, the system comprising:

(a) means for converting the ink information to discrete ink objects, an ink object being handwritten information displayed as handwriting;

(b) means for grouping the ink objects into paragraphs by identifying groups of ink objects separated from other groups by a predefined vertical distance, each such group constituting a paragraph;

(c) means for automatically determining whether each identified paragraph is either a text paragraph or a non-text paragraph; a text paragraph being a group of words separated from other paragraphs on the input tablet by at least said predefined vertical distance;

(d) means for formatting text paragraphs according to a text formatting protocol to produce formatted text paragraphs including one or more ink objects displayed as handwriting; and (e) means for formatting non-text paragraphs according to a non-text formatting protocol to produce formatted non-text paragraphs including one or more ink objects displayed as handwriting, said text and non-text formatting protocols employing different rules.

26. The system of claim 25 further comprising a writing medium on which the user writes ink information.

27. The system of claim 25 further comprising (i) a destination on which the formatting text and non-text paragraphs are displayed; and (ii) means for displaying the formatted text and non-text paragraphs to the destination.

28. The system of claim 27 wherein the destination is a screen on which the user writes ink information.

29. The system of claim 27 wherein the destination is a printed page.

30. The system of claim 28 further comprising means for allowing the user to disable and enable the system for reformatting the ink information.

31. The system of claim 25 further comprising:

(f) means for partitioning the ink objects within a paragraph into one or more lines;

(g) means for partitioning the ink objects in the one or more lines into words displayed in handwritten form;

(h) means for separating the words in the one or more lines by defined word separation distances;

(i) means for separating the one or more lines in the paragraph by defined line separation distances when there is more than one line;

(j) a destination in which words are written in one or more destination lines; and (k) means for writing the words in the paragraph to the destination wherein the words are aligned in the one or more destination lines and wherein the one or more destination lines are separated from one another by the defined line separation distances when there is more than one destination line, and wherein the words in each destination line are separated from one another by the defined word separation distances.

32. The system of claim 31 wherein the destination is the writing medium on which the ink objects were handwritten.

33. The system of claim 32 further comprising means for controlling the time when the means for writing words to the destination writes words to the destination.

34. The system of claim 32 wherein the means for controlling instructs the means for writing words to the destination to writes words to the destination at a preset period after the user has stopped using the pointer on the writing medium.

35. The system of claim 31 wherein the destination is a printed page.

* * * * *